(12) United States Patent
Cohen et al.

(10) Patent No.: US 12,291,472 B2
(45) Date of Patent: May 6, 2025

(54) DECOMPOSITION OF STRUVITE

(71) Applicant: EasyMining Sweden AB, Sollentuna (SE)

(72) Inventors: Yariv Cohen, Uppsala (SE); Patrik Enfält, Uppsala (SE); John Svärd, Gothenburg (SE); Carl-Johan Högberg, Uppsala (SE); Emilie Nordström, Uppsala (SE)

(73) Assignee: Easy Mining Sweden AB, Sollentuna (SE)

( * ) Notice: Subject to any disclaimer, the term of this patent is extended or adjusted under 35 U.S.C. 154(b) by 671 days.

(21) Appl. No.: 17/619,786

(22) PCT Filed: Jun. 11, 2020

(86) PCT No.: PCT/SE2020/050605
§ 371 (c)(1),
(2) Date: Dec. 16, 2021

(87) PCT Pub. No.: WO2020/256622
PCT Pub. Date: Dec. 24, 2020

(65) Prior Publication Data
US 2022/0315460 A1    Oct. 6, 2022

(30) Foreign Application Priority Data

Jun. 17, 2019 (SE) .................................. 1950734-2

(51) Int. Cl.
| | | |
|---|---|---|
| *C02F 1/66* | (2023.01) | |
| *C02F 1/52* | (2023.01) | |
| *C02F 101/16* | (2006.01) | |
| *C05B 7/00* | (2006.01) | |
| *C05B 11/00* | (2006.01) | |

(52) U.S. Cl.
CPC .............. *C02F 1/66* (2013.01); *C02F 1/5254* (2013.01); *C02F 2101/16* (2013.01); *C05B 7/00* (2013.01); *C05B 11/00* (2013.01)

(58) Field of Classification Search
CPC ............. C02F 1/66; C02F 1/5254; C02F 1/52
See application file for complete search history.

(56) References Cited

U.S. PATENT DOCUMENTS

| | | | | |
|---|---|---|---|---|
| 2005/0051495 A1* | 3/2005 | Bowers | .................. | C02F 1/5254 210/906 |
| 2009/0013742 A1 | 1/2009 | Zhang et al. | | |
| 2009/0194476 A1 | 8/2009 | Baur | | |
| 2013/0062289 A1 | 3/2013 | Cote et al. | | |
| 2014/0360237 A1* | 12/2014 | Popa | .................... | C07K 14/195 71/8 |
| 2018/0297846 A1 | 10/2018 | Cohen et al. | | |
| 2019/0062172 A1* | 2/2019 | Mavinic | .................. | C04B 18/04 |

FOREIGN PATENT DOCUMENTS

| | | |
|---|---|---|
| CA | 257803 A | 2/1926 |
| CL | 2016000176 A1 | 12/2016 |
| CL | 2018002609 A1 | 1/2019 |
| CN | 102417169 A | 4/2012 |
| EP | 2431336 A1 | 3/2012 |
| EP | 2904892 A1 | 8/2015 |
| GB | 778252 A * | 7/1957 |
| JP | 2002001259 A | 1/2002 |
| JP | 2011510809 A | 4/2011 |
| SE | 1751571 A1 | 6/2019 |
| WO | WO-2013/136677 A1 | 9/2013 |
| WO | WO-2013133703 A1 | 9/2013 |
| WO | WO-2015010203 A1 | 1/2015 |
| WO | WO-2017158406 A1 | 9/2017 |
| WO | WO-2020242366 A1 | 12/2020 |

OTHER PUBLICATIONS

European Search Report for EP20825557.0 that claims priority to the same parent application as the instant application; dated Jun. 5, 2023; 15 pages.
Alessio Siciliano et al: "Ammonium Removal from Landfill Leachate by Means of Multiple Recycling of Struvite Residues Obtained through Acid Decompoistion", Applied Sciences, vol. 6, No. 11, Nov. 22, 2016, p. 375.
PCT International Search Report and Written Opinion for PCT/SE2020/050605 (published as WO2020256622) which is the parent application to the instant application; dated Jul. 17, 2020, 14 pages.
Abbona F., Lundager Madsen H.E., Boistelle R., 1982. Crystallization of two magnesium phosphates, struvite and newberyite: Effect of pH and concentration. J. Crystal Growth 57, 6-14.
Haiming Huang, Lingyun Huang, Qingrui Zhang, Yang Jiang, Li Ding, 2015. Chlorination decomposition of struvite and recycling of its product for the removal of ammonium-nitrogen from landfill leachate. Chemosphere 136, 289-296.
Haiming Huang <http://pubs.acs.org/author/Huang%2C+Haiming>, Jiahui Liu <http://pubs.acs.org/author/Liu%2C+Jiahui>, Jing Xiao <http://pubs.acs.org/author/Xiao%2C+Jing>, Peng Zhang <http://pubs.acs.org/author/Zhang%2C+Peng>, and Faming Gao <http://pubs.acs.org/author/Gao%2C+Faming>, 2016. Highly Efficient Recovery of Ammonium Nitrogen from Coking Wastewater by Coupling Struvite Precipitation and Microwave Radiation Technology ACS Sustainable Chem. Eng., 4 (7), pp. 3688-3696.

(Continued)

*Primary Examiner* — Ryan B Huang
(74) *Attorney, Agent, or Firm* — Harness, Dickey & Pierce, P.L.C.; Anthony G. Fussner

(57) ABSTRACT

A method for decomposing struvite comprises dissolving of a feed material comprising struvite in a mineral acid. Thereby a solution having an acid pH is formed. Magnesium is removed from the solution. The removing of magnesium comprises increasing a pH of the solution to a pH in the range of 4.5 to 6, precipitating magnesium compounds that do not comprise ammonium, and separating the precipitated magnesium compounds from the solution. Thereby, the solution, after the removing of magnesium, comprises an ammonium salt of the mineral acid. An arrangement for performing such a method is also disclosed. Also, a method and arrangement for recovering at least nitrogen from waste material, based on the decomposing of struvite are disclosed.

17 Claims, 12 Drawing Sheets

(56) References Cited

OTHER PUBLICATIONS

Li X.Z., Zhao Q.L., Hao X.D., Ammonium removal from landfill leachate by chemical precipitation, Waste Management, vol. 19, Issue 6, 1999, pp. 409-415.

Moerman W., Carballa M., Vandekerckhove A., Derycke D., Verstraete W. 2009. Phosphate removal in agro-industry: Pilot- and full-scale operational considerations of struvite crystallization. Water Research, vol. 43, 7, 1887-1892.

Siles J.A., Brekelmans J., Martín M.A., Chica A.F., Martín A., 2010. Impact of ammonia and sulphate concentration on thermophilic anaerobic digestion. Bioresource Technology, vol. 101, 23, 9040-9048.

Stefanowicz, T., Napieralska-Zagozda, S., Osi?ska, M., Samsonowska, K., 1992. Ammonium removal from waste solutions by precipitation of MgNH4PO4 II. Ammonium removal and recovery with recycling of regenerate. Resour. Conserv. Recycl. 6, 339-345.

Sugiyama, S., Yokoyama, M., Ishizuka, H., Sotowa, K.I., Tomida, T., Shigemoto, N., 2005. Removal of aqueous ammonium with magnesium phosphates obtained from the ammonium-elimination of magnesium ammonium phosphate, 6 pages.

Wilson, C.W., 2013. Ammonia recovery from municipal wastewater through a struvite formation-thermal decomposition cycle. M.A.Sc. Thesis, Department of Civil Engineering, The University of British Columbia, Vancouver, BC., 172 pages.

Ying Hao, Sanjay Kumar, Jung Hoon Kwag, Jae Hwan Kim, Jeong Dae Kim, and Chang Six Ra, 2011. Recycle of electrolytically dissolved struvite as an alternative to enhance phosphate and nitrogen recovery from swine wastewater. Journal of Hazardous Materials <http://www.sciencedirect.com/science/journal/03043894> 195 <http://www.sciencedirect.com/science/journal/03043894/195/supp/C>, 175-181.

Zhang, S., Yao, C., Feng, X., Yang, M., 2004. Repeated use of MgNH4PO4·6H2O residues for ammonium removal by acid dipping. Desalination 170, 27-32.

Zhang, T., Ding, L., Ren, H., Xiong, X., 2009. Ammonium nitrogen removal from coking wastewater by chemical precipitation recycle technology. Water Res. 43, 5209-5215.

Analytical Chemistry (and its English translation), (applicable to intermediate industrial chemical analysts), National Machinery Industry Commission, Machinery Industry Press, ISDN 7-111-01187-2/0·32, Dec. 1988; 2 pages.

Search Report for Chile Application No. 202103360 that claims priority to the same parent application as the instant application; dated Nov. 7, 2023; one page.

\* cited by examiner

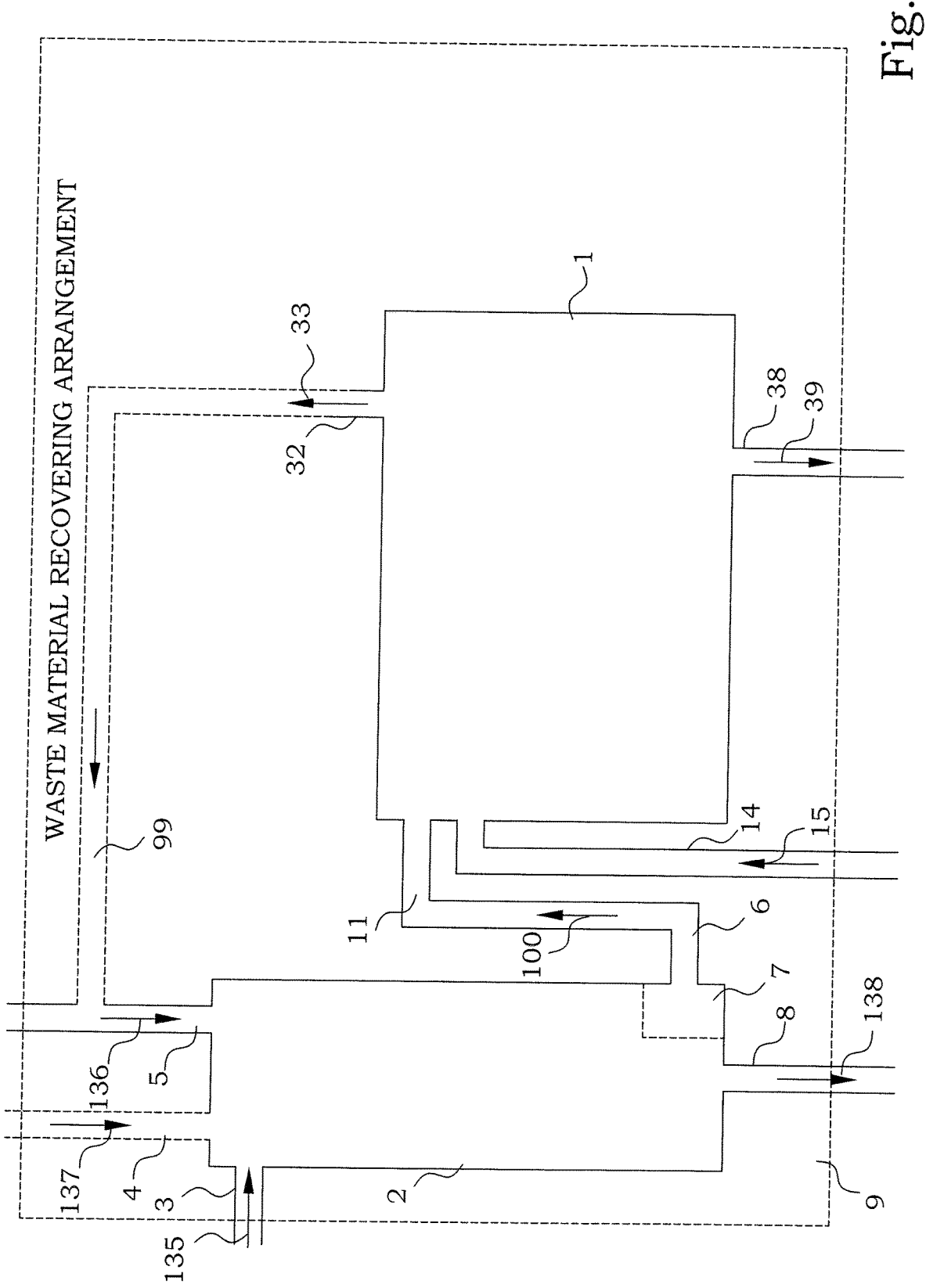

DECOMPOSITION OF STRUVITE

This patent application is a U.S. national stage filing under 35 U.S.C. § 371 of PCT International Application No. PCT/SE2020/050605 filed Jun. 11, 2020 (published as WO2020/256622 on Dec. 24, 2020), which claims priority to and the benefit of Swedish Application No. 1950734-2 filed Jun. 17, 2019. The entire contents of these applications are incorporated herein by reference.

TECHNICAL FIELD

The present technology relates in general to methods and arrangements for chemically processing of struvite, and in particular to methods and arrangements for decomposing struvite for recovery of at least ammonia from the struvite molecule itself.

BACKGROUND

Nitrogen is essential to life and is among the nutrients consumed in the largest quantities by all organisms. Ammonia is synthesized at a massive scale by the fertilizer industry. Approximately 100 Mt of reactive nitrogen is synthesized annually worldwide using the Haber-Bosch process. This anthropogenic ammonia production is in similar magnitude to natural nitrogen fixation, which is estimated to about 150 to 200 Mt nitrogen per year on earth.

Humans and animals excrete a significant fraction of the nutrients contained in the food they ingest. Alongside other agricultural sources, these nutrients find their way back into the environment as municipal wastewater effluents, landfill leachate from disposed organic matter, agro food processing effluents, etc. Anthropogenic loading of nutrients is the main cause for eutrophication of receiving water bodies. Therefore, wastewater treatment plants are needed for treating nutrient rich effluents.

Both processes of synthesizing ammonia and removing it from wastewater are energy and resource intensive. In the Haber-Bosch process, ammonia is synthesized by combining atmospheric nitrogen with hydrogen gas at a temperature and pressure of approximately 450° C. and 30 MPa respectively. The ammonia production industry relies heavily on natural gas as a non-renewable precursor for hydrogen and energy. Ammonia synthesis is considered to be responsible for about 5% of the world's natural gas consumption. It is estimated that global ammonia production accounts for 1.3% of the world's fossil fuel-derived energy use, contributing considerable to greenhouse gas emissions.

In typical environmental conditions the majority of nitrogen in wastewaters exists as dissolved ammonium ions. To achieve nitrogen discharge goals, wastewater treatment plants employ biological nitrogen removal processes, such as nitrification, which is commonly followed by denitrification to ultimately convert ammonia to atmospheric nitrogen.

Biological processes for nitrogen removal are costly and complex. The operating bacteria in such processes are sensitive to a wide range of toxic compounds. Effluents with high salinity cannot be processed. In addition, the performance of biological treatment is very temperature dependent with low efficiency at cold climates. The operational bacteria require long retention times which means large basins. Furthermore, the process is also energy intensive requiring massive aeration to oxidize all ammonium to nitrate. In order to obtain an efficient conversion of nitrate to nitrogen gas by de-nitrification an expensive source of carbon such as methanol is usually needed. The process also generates considerable amounts of climate gases in form of nitrous oxides. And in the end, the reactive nitrogen is destroyed and converted back to atmospheric nitrogen which need to be recovered again by the resource intensive Haber-Bosch process.

The existing technologies for nitrogen removal from effluents are costly and complex. Beside biological treatment, the alternatives are: a) ammonia stripping—require high temperature and/or high pH, high capital and operational costs for treating streams with relatively low ammonium content, b) ammonia adsorption—e.g. adsorption on zeolite requires chemicals for regeneration, high capital and operational costs and difficult to recover ammonia and c) break point chlorination—high operational costs due to required chemicals, nitrogen is lost and not recovered.

A logical conclusion is that nitrogen-containing effluents should be viewed as a nitrogen resource instead of a waste and nitrogen-containing effluents should be exploited through the recovery of nitrogen in forms that could be employed by agriculture or other industries. In Sweden, an environmental goal for recovery of nitrogen from domestic wastewater is being proposed.

Phosphorus is also an important element essential to life. The release of phosphorous to surface waters, and its consequent contribution to eutrophication, has also led to increasing concerns about water quality. Policies were therefore implemented throughout the world, to reduce the levels of phosphorus entering surface waters, by the implementation of technologies to remove phosphorus from domestic and industrial wastewater. In contrast to nitrogen, mineral phosphorus resources are considered limited and finite. In addition, most of the world's phosphorus reserves are controlled by only few countries. Therefore, there is an increasing interest for recycling and beneficial re-use of the phosphorus present in wastes. Several countries have recently introduced a mandatory requirement for recovery of phosphorus from municipal wastewater.

Potassium is also a nutrient consumed in large quantities by all organisms. Similar to phosphorus, potassium is also extracted from limited rock deposits of minerals or from salt lakes. The potassium reserves in the world are also controlled by only a few countries. Recovery of potassium is still not discussed much in society due to that it is not contributing to eutrophication like nitrogen and phosphorus since it is not a limiting nutrient in aquatic environments. In addition, there are no viable technologies today for recovery of potassium from dilute effluents.

Precipitation of struvite from wastewater has been used for producing struvite as a fertilizer. Struvite is a crystal, which is formed with equal molar concentrations of magnesium, ammonium and phosphate combined with six water molecules ($MgNH_4PO_4.6H_2O$). Its molecular weight is 245.43 g per mole, and it is sparingly soluble under neutral and alkaline conditions but readily soluble in acid. The ammonium ion in the struvite crystal lattice can be exchanged with other alkali ions such as potassium or sodium. Hence, there are two additional forms of struvite: a) potassium-struvite ($MgKPO_4.6H_2O$) with a molecular weight of 266.46 g per mole, and b) sodium struvite ($MgNaPO_4.6H_2O$) with a molecular weight of 250.36 g per mole.

Struvite can easily be precipitated from wastewater if the magnesium to other nutrient ratio (N+P, or K+P) is sufficient and the pH is adjusted to neutral or alkaline levels. Struvite precipitation from wastewaters is readily applied in practice in prior art. The applications of struvite precipitation have so far been mainly focused on recovery of phosphorus. Most wastewaters contain sufficient ammonium for phosphorus removal as struvite and the only addition required for struvite precipitation is typically a magnesium source.

Ammonium nitrogen is normally present in effluents at much higher concentrations compared to phosphorus. In order to remove nitrogen in form of struvite from wastewater, large amounts of external phosphorus and magnesium are needed. However, it is impractical to convert high quality sources of phosphorus to struvite just in order to recover ammonium-nitrogen. Such a process would also not be economically viable since the commercial value of struvite is low.

Struvite has been reported in the literature to be precipitated from many different types of wastewaters. Possible applications include: swine wastewater, calf manure wastewater, leather tanning wastewater, sewage treatment sidestreams, dairy wastewater, sewage sludge digester slurry, digester supernatant, industrial wastewater, landfill leachate, lagoon wastewater, poultry manure wastewater, agro-industrial wastes, slaughterhouse wastewater, biogas digester effluents, animal manure, food processing effluents, source separated urine, and fertilizer plant wastewater.

State-of-the-art struvite precipitation is focused on phosphorus removal. This is usually done by addition of magnesium in form of magnesium chloride and sodium hydroxide for pH adjustment or alternatively addition of magnesium hydroxide which provides both a source of magnesium and hydroxyl ions for pH adjustment. There are generally two reasons for recovering struvite from domestic wastewater, the first is to solve struvite scaling problems in the wastewater treatment plant. The second reason is to enable recovery of phosphorus, which is a limited resource.

Precipitation of struvite is usually performed in a special crystallizer which enables to form struvite pellets of specific size range that can be spread on arable land using conventional spreading equipment. The precipitated struvite is thereafter commonly used as a slow release phosphorus fertilizer. To produce struvite pellets is a complicated task. The process requires a long solid retention time of between 8 to 50 days whereas the typical hydraulic retention time is below 10 min. In order to keep the pellets fluidized in the reactor, recycled flow relative to the inflow of up to ca 25% is needed. The installation is complex and costly. It is clear that if pellets are not required struvite can be precipitated in a simple reactor with a short reaction time followed by simple solid liquid separation such as filtration and/or sedimentation.

The main idea behind state-of-the-art precipitation of struvite is to use it as a fertilizer. However, struvite is not an optimal fertilizer. Struvite contains too much magnesium in relation to nitrogen, phosphorus or potassium. For example, according to the Food and Agriculture Organization of the United Nations, the nutrient requirements for a potato crop is 1:78:5:36 in molar ratio of Mg:N:P:K. The nutrient requirement for winter wheat is 1:18:1:7 in molar ratio of Mg:N:P:K. The actual fertilizer requirements depend on the type of crop and the ability of the soil to deliver for example magnesium or potassium by release from clay or soil minerals. A major problem with struvite as a fertilizer is also that it is not water-soluble. This means that the nutrients in struvite are not readily plant available. Therefore, struvite cannot be used as a main fertilizer but can only be used as a supplemental slow release fertilizer for niche applications. It has been recently shown that the plant availability of struvite is being suppressed by a high magnesium content in the soil. This can further limit large scale application of struvite as a fertilizer. Due to the above described reasons the fertilizer value, as well as, economic value of struvite is generally low.

There is a need for a method and arrangements that can enable to recover simultaneously all major plant nutrients from wastewater: phosphorus, nitrogen and possibly potassium.

SUMMARY

A general object is to provide methods and arrangements that enables recovering of major plant nutrients from wastewater.

The above object is achieved by methods and devices according to the independent claims. Preferred embodiments are defined in dependent claims.

In general words, in a first aspect, a method for decomposing struvite comprises dissolving of a feed material comprising struvite in a mineral acid. Thereby a solution having an acid pH is formed. Magnesium is removed from the solution. The removing of magnesium comprises increasing a pH of the solution to a pH in the range of 4.5 to 6, precipitating magnesium compounds that do not comprise ammonium, and separating the precipitated magnesium compounds from the solution. Thereby, the solution, after the removing of magnesium, comprises an ammonium salt of the mineral acid.

In a second aspect, a method for recovering at least nitrogen from waste material comprises precipitating of struvite from an initial liquid of waste material, by adding magnesium compounds that do not comprise ammonium to the initial liquid of waste material and adjusting a pH of the initial liquid of waste material to an alkaline pH. The precipitated struvite is separated from the initial liquid of waste material. The separated struvite is decomposed by a method according to the first aspect.

In a third aspect, an arrangement for decomposing struvite comprises a dissolver arranged for dissolving a feed material comprising struvite in a mineral acid. Thereby a solution having an acid pH is formed. The dissolver has an input for the feed material, an input for the mineral acid and an output for the solution having an acid pH. The arrangement further comprises a magnesium-remover section arranged for removing magnesium from the solution. Thereby a solution comprising an ammonium salt of the mineral acid is given. The magnesium-remover section has an input connected to the output for the solution having an acid pH of the dissolver, an output for precipitated magnesium compounds, and an output for the solution comprising an ammonium salt of the mineral acid. The magnesium-remover section is arranged for increasing a pH of the solution from the dissolver to a pH in the range of 4.5 to 6, for precipitating magnesium compounds that do not comprise ammonium and for separating the precipitated magnesium compounds from the solution.

In a fourth aspect, an arrangement for recovering at least nitrogen from waste material, comprises a struvite precipitator. The struvite precipitator has an input for an initial liquid of waste material, and an input for magnesium compounds that do not comprise ammonium. The struvite precipitator is arranged for mixing the initial liquid of waste material and the magnesium compounds, and for adjusting a pH of the initial liquid of waste material to an alkaline pH. Thereby, struvite precipitates. The struvite precipitator comprises a separator, arranged for separating the precipitated struvite from the initial liquid of waste material, and an output for the precipitated struvite. The arrangement further comprises an arrangement for decomposing struvite according to the third aspect. The feed input of the dissolving reactor is connected to the output for the precipitated struvite of the struvite precipitator.

One advantage with the proposed technology is that a cost effective method for decomposition of struvite is presented, which in turn enables formation of valuable ammonium salts using the nitrogen content in the struvite itself and at the same time to enable reuse of the magnesium source for repeated nitrogen precipitation. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which:

FIG. 4 illustrates an embodiment of an arrangement for recovering at least nitrogen from waste material;

DETAILED DESCRIPTION

Figure 1:
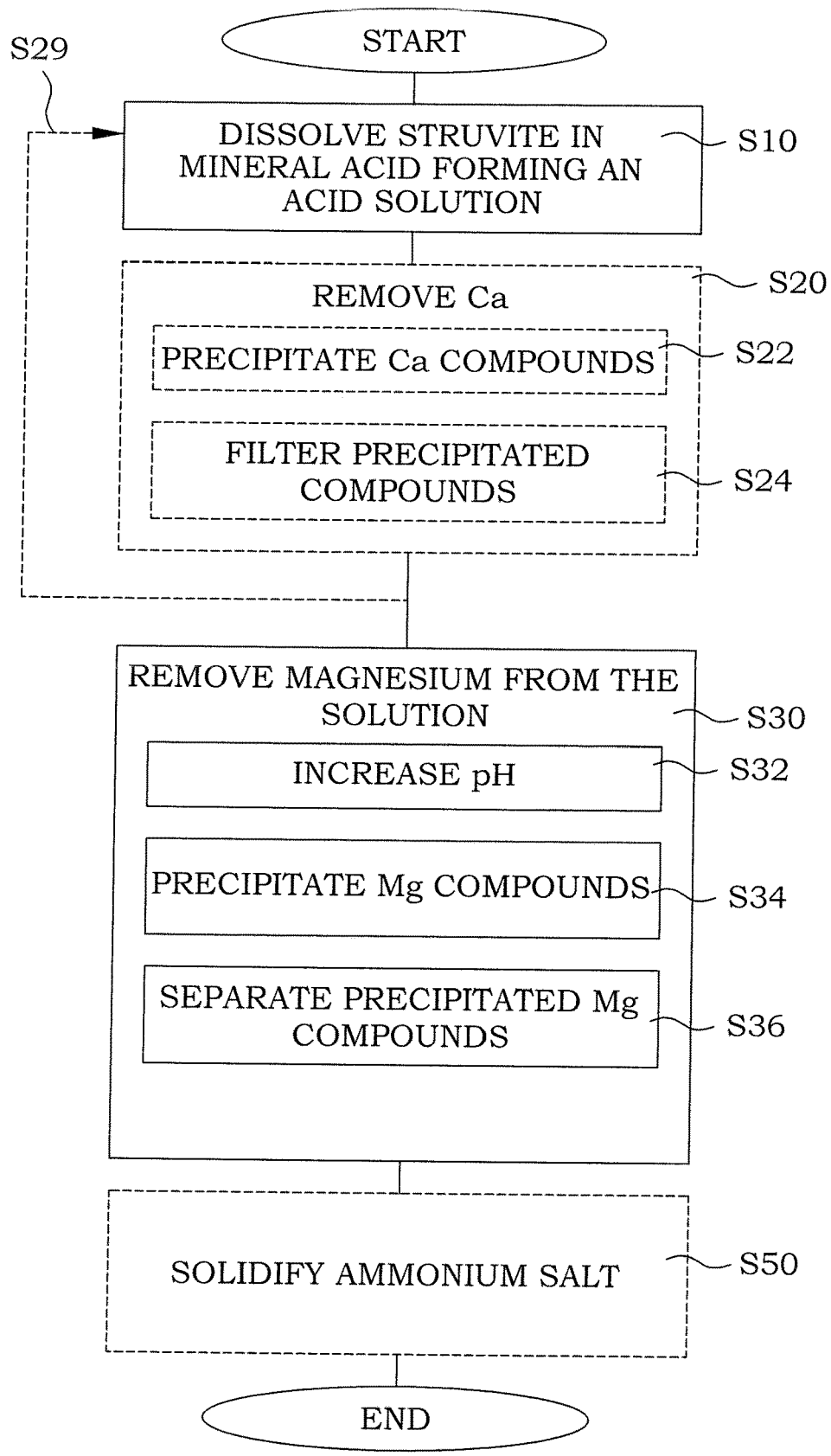
FIG. 1 illustrates a flow diagram illustrating steps of an embodiment of a method for decomposing struvite.

Throughout the drawings, the same reference numbers are used for similar or corresponding elements.

If an inexpensive source of magnesium and phosphorus was available, the potential is there, by use of struvite precipitation, to recover ammonia from nutrient-rich wastewaters, rather than biologically convert it back to atmospheric nitrogen.

Common to all prior art relating to struvite decomposition is that the focus is solely on recovery or removal of ammonium nitrogen. None of the prior art processes can enable reuse of the magnesium and phosphorus source for repeated nitrogen precipitation in form of struvite.

There is thus a need for a robust process that can enable decomposition of struvite to enable recovery of nitrogen as well as reuse of the magnesium and phosphorus sources for subsequent ammonium nitrogen removal in which the regeneration efficiency is not affected by e.g. co-precipitation of calcium phosphate, calcium carbonate, magnesium carbonate or potassium struvite.

There is a need for a process that can enable reuse of the magnesium and phosphorus from struvite in a reactive form such as e.g. di-magnesium phosphate or newberyite of high quality. The constant quality of recovered magnesium and phosphorus sources should be assured independent on the struvite composition and number of repeated cycles.

There is a need for a robust method for struvite decomposition that is not energy intensive.

There is a need for a method for struvite processing that can omit the need to precipitate struvite in form of pellets in special fluidized bed reactors which require high capital and operational costs during wastewater treatment.

There is a need for a method for struvite decomposition with a favourable mass balance in which input chemicals are converted into final commercial products.

There is a need for a method that enables recovery of ammonia in different ammonium salt forms.

There is a need for a cost effective method for decomposition of struvite to enable formation of valuable ammonium salts using the nitrogen content in the struvite itself and at the same time to enable reuse of the magnesium and phosphate source for repeated precipitation.

According to the present technology, an inexpensive source of magnesium and phosphorus can be derived from the struvite molecule itself. This magnesium and phosphorus can thereafter be used for struvite precipitation from water effluents. This enables the recovery of the ammonium that is bound within struvite but originates from the water effluents.

Several attempts were made in the literature to provide a process for decomposing struvite to enable recovery or removal of ammonia.

Extensive research was dedicated to the thermal decomposition of struvite to enable release of ammonia from struvite by heating e.g. according to Stefanowicz et al. 1992. The main disadvantage of this approach is that after thermal decomposition of struvite a magnesium pyrophosphate residue is formed which is not effective in precipitating ammonium nitrogen from wastewater.

Thermal decomposition of struvite occurs in several steps. At the first step, ammonium struvite ($MgNH_4PO_4 \cdot 6H_2O$) is converted to dittmarite ($MgNH_4PO_4 \cdot H_2O$) by the removal of water. Dittmarite is more thermally stable than struvite. Further heating of the formed dittmarite results in the release of additional water and ammonia forming eventually magnesium pyrophosphate ($Mg_2P_2O_7$).

Farhana, 2015, suggested to thermally decompose ammonium struvite in a fluidized bed reactor in which struvite pellets are kept fluidized in the reactor for 2 to 4 hours at a temperature of 85° C. and at a relative humidity of 95%. The aim was to decompose struvite into di-magnesium phosphate instead of magnesium pyrophosphate by having a relatively low temperature and high humidity. The disadvantages of this process include high complexity due to requirement for struvite pellets of a certain size and hardness in order to be kept fluidized. The conversion of struvite to dimagnesium phosphate was found to be incomplete for several of the struvite pellets tested. The hardness and size of the pellets is a main factor regarding conversion efficiency and to get the process operational. Soft pellets could not be processed since they form dust. In addition the process is energy intensive requiring large amount of hot air and steam.

Common to all thermal struvite conversion processes is that the processes are not suitable for decomposing potassium struvite or calcium phosphates. Many wastewaters contain considerable amounts of dissolved potassium and calcium. This means that when struvite is precipitated from such wastewater at a high pH a mixture of several forms of struvite is usually present such as ammonium struvite ($MgNH_4PO_4 \cdot 6H_2O$) together with potassium struvite ($MgKPO_4 \cdot 6H_2O$). The presence of dissolved calcium leads to co-precipitation of calcium phosphate together with struvite. Since thermal struvite regeneration is based on thermally removing ammonia in a gaseous form it cannot regenerate calcium phosphates or potassium struvite. This means that if the struvite decomposition product from thermal processes is reused for wastewater treatment, the efficiency will be declining rapidly with time due to an accumulation of calcium and potassium in the residue that cannot be regenerated.

Zhang, S. et al. 2004 suggested a process to decompose ammonium struvite in a hot hydrochloric acid solution at pH between 4 and 5.5. The principle was to convert struvite to di-magnesium phosphate due to that di-magnesium phosphate has a lower solubility compared to struvite at slightly acidic pH and at temperatures above 25° C. The disadvantages of this process include low efficiency of the recrystallization of struvite to di-magnesium phosphate. In addition, the process cannot regenerate the phosphorus from co-precipitated calcium phosphate since the solubility of calcium phosphate is considerably lower than that of di-magnesium phosphate at acidic pH. Furthermore, high phosphorus solubility at low pH results in considerable phosphorus losses in each regeneration cycle. In addition, the conditions of the recrystallization according to Zhang et al. results in a very dilute ammonium chloride solution with a concentration of only about seven grams nitrogen per litre which is costly to transport.

Zhang, T. et al. 2009 tested to decompose ammonium struvite thermally in a hot aqueous alkaline solution. The idea was to release the ammonia first to the aqueous solution forming tri-magnesium phosphate. The ammonia in the hot alkaline solution is converted into gaseous form and can be separated. The process has several disadvantages. The conversion of struvite into tri-magnesium phosphate was found to be incomplete. The process cannot regenerate the phosphorus from co-precipitated calcium phosphate since calcium phosphates are not soluble in alkaline solutions which means that the decomposition product is gradually being fouled with calcium decreasing its efficiency.

Huang et al. 2015 suggested a process for decomposing struvite by addition of sodium hypochlorite to form di-magnesium phosphate. The main disadvantage of the process is that nitrogen cannot be recovered and is lost in form of nitrogen gas. In addition, the process has high operational costs and similar to other struvite decomposition processes cannot regenerate potassium struvite or calcium phosphates which reduces the efficiency of the decomposition product if repeated used in real wastewater.

Huang et al. 2015 further suggested a process for decomposition of struvite by using microwave radiation. The struvite is mixed with sodium hydroxide and treated by microwave radiation to release ammonia and convert struvite into a sodium magnesium phosphate compound which is claimed to be reactive for aqueous ammonia removal by struvite precipitation. The disadvantages of this process includes high operational and capital costs, need for complicated equipment and requirement for large amounts of sodium hydroxide. In addition, the process is not suitable for regeneration of potassium struvite or calcium phosphates which results in poor ammonia removal capacity over time.

Hao et al., 2011 suggested a process for electrochemical decomposition of struvite. The main disadvantage is that nitrogen cannot be recovered and is lost in form of nitrogen gas as well as high capital and operational costs.

However, according to the here presented technology, struvite is dissolved using a mineral acid. The acid solution is preferably first freed from calcium. Then, the magnesium and preferably also at least the main part of the phosphate components are separated from the ammonium. The extracted ammonium is provided in a form that is commercially attractive. The separated phosphorus and magnesium can be re-utilized in e.g. a wastewater application. There are many attractive solutions of the different part processes.

FIG. 1 illustrates a flow diagram illustrating steps of an embodiment of a method for decomposing struvite. In step S10, a feed material comprising struvite is dissolved in a mineral acid. This dissolving results in the formation of a solution having an acid pH. The so formed solution is typically a clear solution, but may present some precipitated compounds, as is discussed here below. This acid solution comprises phosphate ions, magnesium ions and ammonium ions. All the common mineral acids are possible to use in this respect.

The dissolution of the struvite in sulphuric acid takes place according to the following chemical reaction:

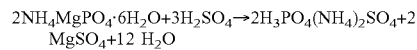

Sulphuric acid is produced as a by-product from several industrial processes such as refining of copper sulphide ore, refining of iron sulphide ore etc.

Since sulphuric acid is an unavoidable by-product for production of several valuable products, the production of such products is in many cases limited by finding an outlet for the by-product sulphuric acid. Usually, this is solved by industrial symbiosis, i.e. the by-product sulphuric acid is used as a raw material for production of another product.

The dissolution of the struvite in hydrochloric acid takes place according to the following chemical reaction:

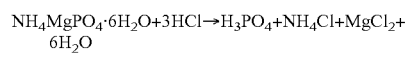

Hydrochloric acid is produced as a by-product from several industrial processes such as: the chlor-alkali industry, production of vinyl chloride, production of polytetrafluoroethylene, incineration of PVC, production of sodium sulfate, production of potassium sulfate, combustion of chlorine, production of perchloroethylene, production of dichlormethane, production of trichloroethylene, as a by-product of phosagene-polyurethane chain.

Since hydrochloric acid is an unavoidable by-product for production of several valuable products, the production of such products is in many cases limited by finding an outlet for the by-product hydrochloric acid. Usually, this is solved by industrial symbiosis, i.e. the by-product hydrochloric acid is used as a raw material for production of another product such as calcium chloride, magnesium chloride, etc.

The dissolution of the struvite in nitric acid takes place according to the following chemical reaction:

$$NH_4MgPO_4 \cdot 6H_2O + 3HNO_3 \rightarrow H_3PO_4 + NH_4NO_3 + Mg(NO_3)_2 + 6H_2O$$

Nitric acid is a desired ingredient in fertilizers

The dissolution of the struvite in phosphoric acid takes place according to the following chemical reaction:

$$NH_4MgPO_4 \cdot 6H_2O + 3H_3PO_4 \rightarrow NH_4H_2PO_4 + H_3PO_4 + Mg(H_2PO_4)_2 + 6H_2O$$

As discussed in the introduction, struvite is rarely precipitated in a pure form of ammonium-struvite. Wastewater usually contain significant amounts of calcium, potassium and carbonates which usually result in a significant co-precipitation of calcium phosphates, calcium carbonates, potassium struvite, and magnesium carbonate.

According to the present technology, the above mentioned co-precipitates can be easily removed or do not interfere with the struvite processing method. This makes the process according to the present invention a robust technology in which mixtures of different struvite precipitates originating from different applications and thus having different chemical composition can be processed in a single central plant. This is presented by different preferred embodiments.

In one embodiment, e.g. the embodiment illustrated in FIG. 1, the method may comprise an optional step S20, in which Ca is removed from the acid solution. This optional embodiment is marked with dotted lines. This embodiment is preferred if the feed material further comprises calcium compounds. In such a case, the step of dissolving S10 of the feed material further comprises dissolving the calcium compounds into the solution, at least temporarily. This removing of calcium S20 from the acid solution takes place before magnesium and phosphorus are removed from the solution, as will be described further below.

In a part step S22, calcium compounds are precipitated from the solution. In the part step S24, the precipitated calcium compounds are filtered from the solution. The details of these steps may differ somewhat depending on the actual mineral acid used. This will be discussed further below.

Precipitated struvite can contain some acid-insoluble components such as sand, etc. The non-insoluble residue is therefore separated with any suitable solid/liquid separation technique such as filtration, centrifugation, sedimentation, etc. This can be performed before or in combination with step S20, if any.

Since some organic material can also co-precipitate with struvite, some dissolved organic matter can enter the struvite leach solution. The dissolved organic matter is therefore preferably separated from the struvite leach solution. Several options exist for separation of dissolved organic matter such as adsorption on activated carbon, chemical oxidation, flocculation, etc.

According to the here presented technology, the dissolution of struvite is performed in a way to enable production of a leach solution preferably with as high concentration as possible. The production of a concentrated solution during struvite dissolution enables the efficient recovery of the salts from mineral acid in form of fertilizers.

To this end, in a preferred embodiment, as indicated by the arrow S29 of FIG. 1, a back bleed of a part of the leach solution after the dissolving process is performed. In other words, a part of the leach solution is recycled and reused as an additional solvent in a subsequent dissolving step. Experiments have shown that a bleed back of 20% of the leach solution may lead to a twice as high concentration of phosphate ions in the leach solution compared to an approach without bleed back, when using sulphuric acid. A bleed back of 30% gives almost 2.5 times as high final phosphate ion concentration.

In other words, in a preferred embodiment, a part of the solution after the step of removing calcium is fed back in step S29 to be added in a subsequent step of dissolving a feed material.

In a preferred embodiment, the amount of bleed back in step S29 is controlled to give a final phosphate ion concentration after the step of removing calcium S20 of at least 1 molar.

The struvite leach solution after pre-treatment is ready for chemical processing.

Thus, independent on the composition of the co-precipitates, the struvite leach solution will contain at least the following elements in a soluble form: phosphate, ammonium and magnesium, and an anion corresponding to the used mineral acid.

A main advantage of the present technology is that the struvite entering to the processing plant does not need to be e.g. in a form of pellets as in state-of-the-art struvite precipitation technologies. The main reason is that the intention is not to spread the struvite on agricultural land but instead dissolve it in a mineral acid. Since pellets are not required, the struvite precipitation process can be done in a simple and low cost manner. Struvite can be precipitated in a simple reactor with a short reaction time followed by simple solid liquid separation such as by filtration and/or sedimentation.

Again, returning to FIG. 1, in step S30, magnesium is removed from the acid solution. In the embodiment of FIG. 1, the removing comprises a number of part steps. In step S32, a pH of the solution is increased to a pH in the range of 4.5 to 6. Magnesium compounds that do not comprise ammonium are precipitated in step S34. In step S36, the precipitated magnesium compounds are separated from the solution. This means that after the step of removing magnesium S30, the solution comprises an ammonium salt of the mineral acid.

In one embodiment, the dissolution of struvite may not be fully complete. It has been found that a recrystallization of struvite into newberyite may occur even before a complete dissolving of the solid parts is performed. This can be described as if the steps of dissolving S10 a feed material and precipitating S34 magnesium compounds that do not comprise ammonium occurs at least partly concurrently. The struvite is dissolved, and the phosphate ion and magnesium ion are again immediately precipitating involving a hydrogen instead of the ammonium ion.

The total reaction may approximately be described as:

$$NH_4MgPO_4 \cdot 6H_2O(s) + Hac(aq) \rightarrow MgHPO_4 \cdot 3H_2O(s) + 3H_2O + NH_4Ac(aq),$$

where Ac is the anion of the mineral acid.

Examples of this will be discussed further below.

If calcium is present in the solution and sulphuric acid is used for the dissolving or otherwise added, gypsum will be precipitated together with the newberyite. If this newberyite, as described elsewhere, is reused for generating new struvite, e.g. by exposure to waste water, gypsum will gradually enrich. In such cases, it might therefore be needed to let the struvite be completely dissolved occasionally, in order to be able to remove the gypsum. Alternative methods may also employ leach flows to keep the gypsum content limited.

The solution of the ammonium salt of the mineral acid may be used as an end product, or as a feed chemical to other processes. However, in order to utilize the fertilization properties of these salts, it is preferred to convert the salt solution into a solid end product.

In other words, as illustrated by the optional step S50, the ammonium salt of the mineral acid is solidified from the solution.

Figure 2:
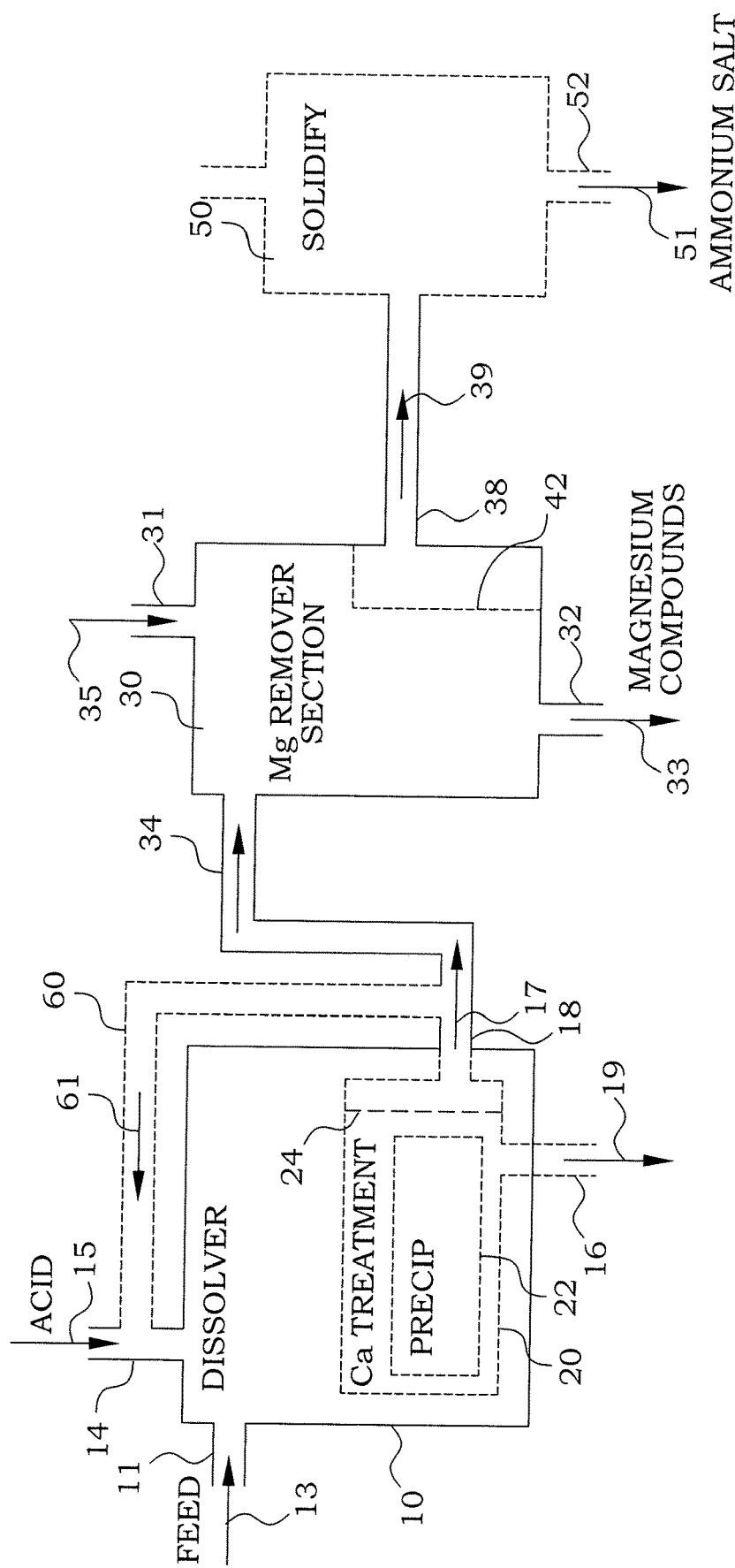
FIG. 2 illustrates schematically an embodiment of an arrangement for decomposing struvite.

FIG. 2 illustrates a schematic illustration of an embodiment of an arrangement 1 for decomposing struvite. In this embodiment, the arrangement 1 for decomposing struvite comprises a dissolver 10 and magnesium-remover section 30. The dissolver 10 is arranged for dissolving a feed material 13, comprising struvite, in a mineral acid 15. Thereby a solution having an acid pH 17, is formed. The dissolver 10 has an input 11 for entering the feed material 13 comprising struvite. The dissolver 10 also has an input 14 for entering a mineral acid 15. The dissolver 10 further has an output 18 for the acid solution comprising dissolved struvite 19. The dissolver 10 is thereby configured for mixing struvite of the feed material 13 and the mineral acid 15 for causing the above mentioned dissolution of the struvite.

In a preferred embodiment, pre-treatment of the dissolved solution is performed for preparing the solution for the coming operation steps. In particular in applications where the feed material further comprises calcium compounds, separation of unwanted substances may be of importance. In such a case, the dissolver 10 further dissolves the calcium compounds into the solution, at least temporarily. The dissolver preferably further comprises a calcium-remover section 20 arranged for removing calcium from the acid solution. The calcium-remover section 20 comprises means for causing precipitation of calcium compounds 22 from the solution and a filter 24 for filtering the precipitated calcium compounds from the solution. The filter 24 can also be used for filtering away other unsolvable substances, such as e.g. sand that might have been contaminating the struvite.

In a further preferred embodiment, the dissolver 10 may also comprise an organic compounds removing arrangement. Organic compounds may e.g. be removed by use of activated carbon, chemical oxidation or other processes, as such well known in the art. Additional substances may thereby be added to the dissolver 10 and impurities may be removed.

As mentioned further above, back bleed of the solution is typically advantageous, even though it is not absolutely necessary. Therefore in a preferred embodiment, there is provided, as a part of the dissolver features, a back-bleed connection 60. The back bleed connection 60 is arranged for recycling a part 61 of the solution exiting the calcium-remover section 20 to be used in a subsequent dissolving of struvite. Typically, the back bleed part 61 is re-entered into the dissolver 10 together with the mineral acid 15 through the input 14. Alternatively, the back bleed could have a separate input into the dissolver 10.

In other words, a feed-back connection is provided between an output for the solution after filtering of the calcium-remover section and an input to the dissolver for adding a part of the solution after filtering to be added for a subsequent dissolving of the feed material.

The precipitator vessel 40 is configured for precipitating magnesium compounds 43 from the entered solution by increasing a pH of the solution. The precipitator vessel 40 has a separation arrangement 48 for separating the precipitated magnesium compounds 43 from the remaining solution. The precipitator vessel 40 has an input 41 for the solution, directly or indirectly connected to the output 24 for the solution after phosphate ion extraction 25 of the phosphate ion removing section 20. The precipitator vessel 40 has also an input 44 for pH regulating substances 45. The precipitator vessel 40 further has an output 42 for the precipitated magnesium compounds 43 and an output 46 for a solution comprising ammonium sulphate 47.

The arrangement 1 for decomposing struvite further comprises a magnesium-remover section 30 arranged for removing magnesium from the solution. Thereby a solution 39 comprising an ammonium salt of the mineral acid is produced. The magnesium-remover section 30 has an input 31 connected to the output 18 for the solution having an acid pH 17 of the dissolver 10. The magnesium-remover section 30 has further an output 32 for precipitated magnesium compounds 41, and an output 38 for the solution 39 comprising an ammonium salt of the mineral acid. The magnesium-remover section 30 is arranged for increasing a pH of the solution from the dissolver 10 to a pH in the range of 4.5 to 6, for precipitating magnesium compounds that do not comprise ammonium. The magnesium-remover section 30 is further arranged for separating the precipitated magnesium compounds from the solution, e.g. by a filter 42. Different embodiments of such arrangements will be discussed further below.

In a preferred embodiment, the arrangement 1 for decomposing struvite is also arranged for treating the salt solution. In such an embodiment, the arrangement 1 for decomposing struvite comprises an end solidifying arrangement 50 connected to the output 38 for the solution 39 comprising an ammonium salt of the mineral acid of the magnesium-remover section 30. The end solidifying arrangement 50 is arranged for crystallizing the ammonium salt of the mineral acid from the solution. The end solidifying arrangement 50 has an output 52 for a solid product 51 of the ammonium salt of the mineral acid.

The method according to FIG. 1 and the arrangement according to FIG. 2 can be operated as such as methods and arrangements for general decomposition of struvite. The struvite is thereby decomposed into valuable substances comprising the components phosphorus, typically in the form of magnesium or ammonium compounds, nitrogen, typically in the form of ammonium salts, and magnesium, typically as a phosphate compound.

As also will be discussed further below, preferred ways of separating the magnesium and at least a part of the phosphorus from the struvite leach solution is to use precipitation of magnesium compounds.

The magnesium content thus becomes available, and, as also discussed below, is preferably reused as a magnesium source for waste water treatment or to be re-entered into the process at any other point. However, it may also be turned into other products of commercial interest.

However, the decomposition of struvite can also be implemented as a part of other industrial processes. As mentioned in the background, some waste water treatment approaches extracts nitrogen and phosphorus by precipitation of struvite. By having access to the above presented decomposition of struvite, such a waste water treatment can be developed further to be more economical and efficient, in particular if the separated magnesium products can be reused for the struvite precipitation.

Figure 3:
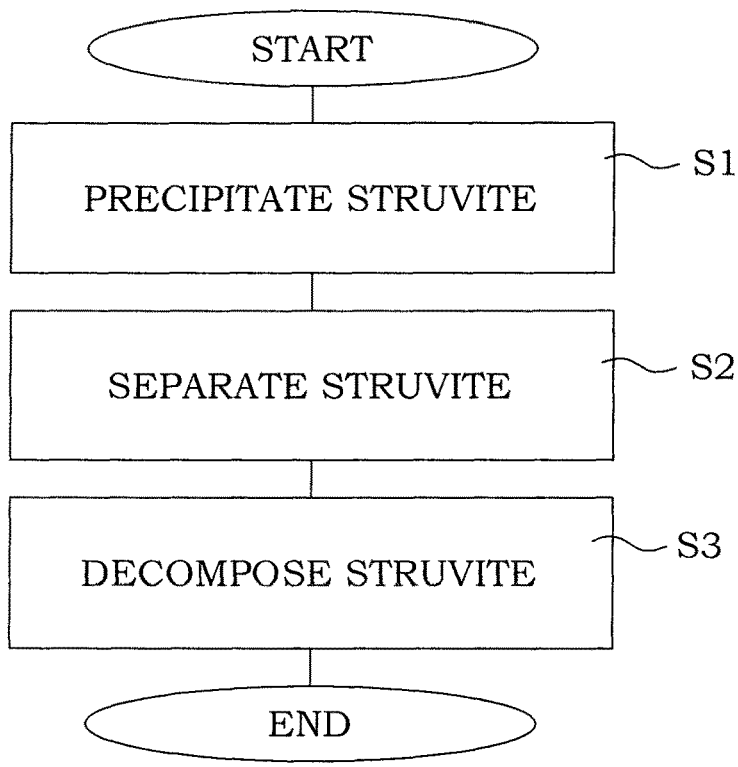
FIG. 3 illustrates a flow diagram of steps of an embodiment of a method for recovering at least nitrogen from waste material.

FIG. 3 illustrates a flow diagram of steps of an embodiment of a method for recovering at least nitrogen from waste material. In step S1, struvite is precipitated from an initial liquid of waste material. This is achieved by adding a magnesium source to the initial liquid of waste material and adjusting a pH of the initial liquid of waste material to assume an alkaline pH. In step S2, the precipitated struvite is separated from the initial liquid of waste material. In step S3, the separated struvite is decomposed. This decomposing is preferably performed by a method according to what was described here above.

In other words, an embodiment of a method for recovering at least nitrogen from waste material comprises precipitating of struvite from an initial liquid of waste material, by adding magnesium compounds that do not comprise ammonium to the initial liquid of waste material and adjusting a pH of the initial liquid of waste material to an alkaline pH. The precipitated struvite is separated from the initial liquid of waste material and the separated struvite is decomposed by a method according to the procedures disclosed elsewhere in this disclosure.

Preferably, at least a part of the precipitated magnesium compounds that do not comprise ammonium in the step of decomposing the separated struvite is used as at least a part of the added magnesium compounds that do not comprise ammonium in a subsequent step of precipitating struvite from an initial liquid of waste material. Thereby, the magnesium can be circulated within the system without being consumed. The magnesium thus contributes to the extraction of nitrogen in the form of ammonium, but is later recovered from the produced struvite and can be used for a next nitrogen extraction operation.

In one embodiment, this precipitated magnesium compounds that do not comprise ammonium comprise newberyite.

It was further discovered that the kinetics of precipitating struvite from waste material by use of magnesium compounds could be improved considerably if struvite crystals were added to the waste material along the other magnesium compounds. These struvite provided into the initial liquid of waste material are thus operating as seed crystals.

As was considered above, calcium provided together with the struvite may be removed, e.g. precipitated as gypsum, and will not interfere with the remaining process. Lime is a relatively inexpensive base and is therefore a suitable choice for adjusting the pH in the initial liquid of waste material. In other words, preferably, adjusting a pH of the initial liquid of waste material to an alkaline pH is performed by adding lime. Thereby, any precipitated calcium compounds are separated together with said precipitated struvite.

FIG. 4 illustrates, in analogy, an embodiment of an arrangement 9 for recovering at least nitrogen from waste material. The arrangement 9 for recovering at least nitrogen from waste material comprises in this embodiment a struvite precipitator 2, here in the form of a waste material treatment tank, and an arrangement 1 for decomposing struvite. The arrangement 1 for decomposing struvite is preferably arranged according to any of the embodiments of arrangements for decomposing struvite presented in the present disclosure.

The struvite precipitator 2 has an inlet 3 for an initial liquid 135 of waste material. The struvite precipitator 2 also has an inlet 5 for a magnesium source 136. Depending on the type of magnesium source 136, it may be necessary also to have an optional inlet 4 for a base 137. The inlets 4 and 5 may of course be arranged as one common inlet. The struvite precipitator 2 is configured for precipitating struvite 100 from the initial liquid 135 of waste material. This is achieved by adding the magnesium source 136 and adjusting a pH of the initial liquid 135 of waste material to an alkaline pH. This pH adjustment may be performed by the magnesium source, e.g. if magnesium hydroxide is used. For other magnesium sources, such as e.g. newberyite, additional bases 137 may be added for adjusting the pH. As mentioned above, lime is an inexpensive base, and calcium is easily separated as gypsum in the continued process.

In one embodiment, the struvite precipitator 2 has an input for lime, for enabling the adjusting a pH of the initial liquid of waste material 135 to an alkaline pH.

The struvite precipitator 2 comprises a separator 7 configured for separating the precipitated struvite 100 from the initial liquid 135 of waste material. The struvite precipitator 2 has an outlet 8 for liquid 138 of waste material separated from the precipitated struvite 100, and an outlet 6 for the precipitated struvite 100.

In other words, an embodiment of an arrangement for recovering at least nitrogen from waste material comprises a struvite precipitator and an arrangement for decomposing struvite. The struvite precipitator has an input for an initial liquid of waste material, and an input for magnesium compounds that do not comprise ammonium. The struvite precipitator is arranged for mixing the initial liquid of waste material and the magnesium compounds, and for adjusting a pH of the initial liquid of waste material to an alkaline pH, whereby struvite precipitates. The struvite precipitator comprising a separator, arranged for separating the precipitated struvite from the initial liquid of waste material, and an output for the precipitated struvite.

The arrangement for decomposing struvite is arranged according to the principles presented elsewhere in this disclosure. The feed input of the dissolving reactor is connected to the output for the precipitated struvite of the struvite precipitator.

Preferably, the output for precipitated magnesium compounds of the magnesium-remover section is connected to the input for magnesium compounds that do not comprise ammonium of the struvite precipitator, for using at least a part of the precipitated magnesium compounds that do not comprise ammonium produced in the arrangement for decomposing struvite in a subsequent precipitation of struvite. In one embodiment, such magnesium compounds comprise newberyite.

Furthermore, in analogy with what was discussed here above, the struvite precipitator 2 has preferably an input for adding of struvite into the initial liquid of waste material for use as seed crystals.

Preferably, the struvite precipitator has an input for adding of calcium compound for achieving the adjustment of a pH, whereby any precipitated calcium compounds are separated together with the precipitated struvite.

As will be discussed more in detail below, at least a part of the magnesium compounds 41 removed during the decomposition of the struvite in the arrangement 1 for decomposing struvite, may be utilised as at least a part of the magnesium source 136 entered into the struvite precipitator 2. A magnesium recirculation connection 99 is thereby provided from the arrangement for decomposing struvite 1 to the waste material treatment tank 2.

The step S20 of the preferred embodiment of FIG. 1, in which Ca is removed from the acid solution, can be performed in different ways depending on the actual mineral acid used in the struvite dissolving. If sulphuric acid is used, sulphate ions are provided into the solution, and consequently, calcium phosphate co-precipitated with the struvite becomes recrystallized in the sulphuric acid, binding the calcium as gypsum according to the following equation:

$$Ca_3(PO_4)_2(s) + 3H_2SO_4 \rightarrow 2H_3PO_4 + 3CaSO_4(s)$$

Co-precipitated calcium carbonate is similarly dissolved in sulphuric acid under emission of carbon dioxide and the calcium is precipitated as gypsum according to the following equation:

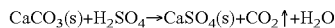
$$CaCO_3(s)+H_2SO_4 \rightarrow CaSO_4(s)+CO_2\uparrow+H_2O$$

Figure 5:
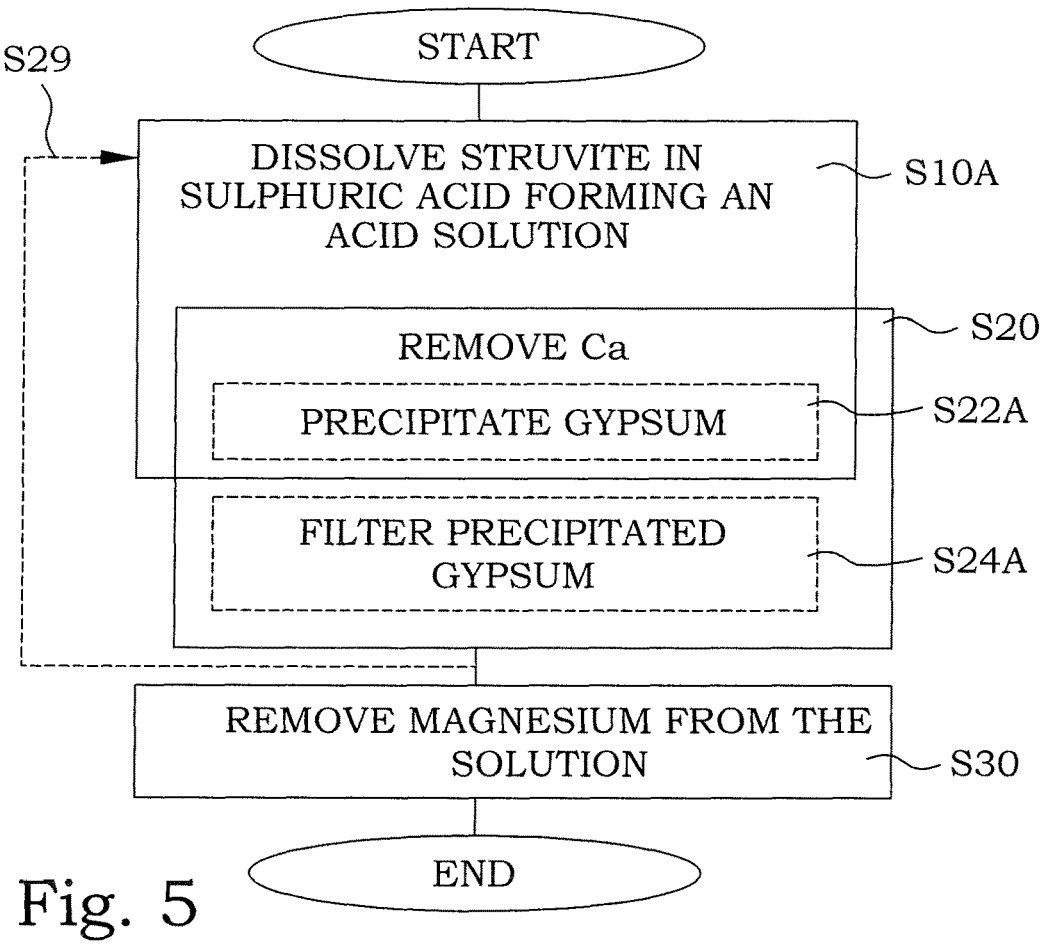
FIGS. 5-7 illustrate flow diagrams of steps of other embodiments of a method for decomposing struvite.

The step S22 can in such an application be considered to be a part step also of the actual dissolving step S10, as illustrated in FIG. 5. In step S10A, struvite is dissolved in sulphuric acid, thereby forming an acid solution. In step S22A, gypsum is precipitated, and in step S24A, the precipitated gypsum is filtered.

In other words, when the mineral acid is sulphuric acid, the steps of dissolving S10A a feed material and precipitating S22A calcium compounds occurs concurrently. The precipitated calcium compounds comprise gypsum.

The use of sulphuric acid for dissolving struvite leads also in general to that the solution, after the step S30 of removing magnesium, comprises ammonium sulphate.

Figure 6:
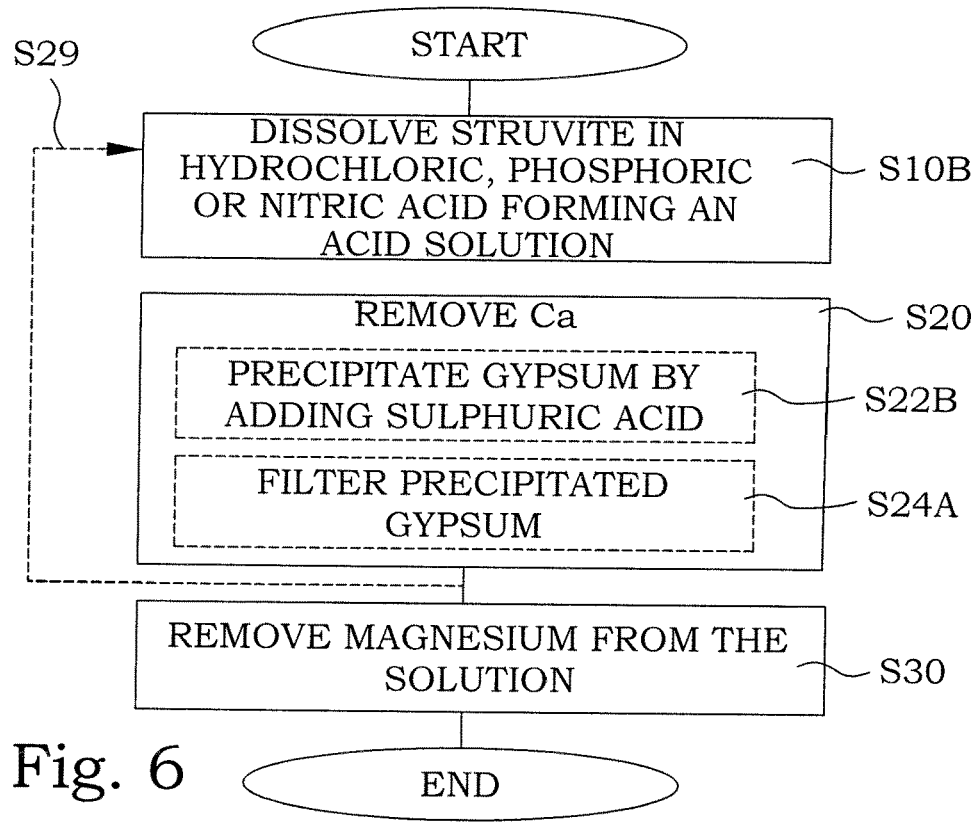

Alternatively, as indicated above, other mineral acids can also be used for dissolving struvite. In embodiments where the mineral acid is at least one of hydrochloric acid, phosphoric acid and nitric acid, any co-dissolved calcium compounds can still be removed as gypsum. FIG. 6 illustrates such an embodiment. In step S10B struvite is dissolved in at least one of hydrochloric acid, phosphoric acid and nitric acid. In step S22B, by adding sulphuric acid to the, already, acid solution, sulphate ions are introduced. These sulphate ions will together with any calcium ions in the solution precipitate as gypsum. This selective precipitation is tested to operable for all of hydrochloric acid, phosphoric acid and nitric acid as main dissolving acid.

Preferably, the amount of sulphuric acid is adapted to the amount of calcium in the struvite feed material. The amount of sulphuric acid should thereby preferably be enough to cause precipitation of all calcium ions from the acid solution. At the same time, if the end product is requested to be well-defined, the excess amount of sulphuric acid should be kept low.

In other words, in an embodiment where the mineral acid is at least one of hydrochloric acid, phosphoric acid and nitric acid, the step of precipitating calcium compounds comprises addition of sulphuric acid, thereby causing precipitation of said calcium compounds as gypsum.

Figure 7:
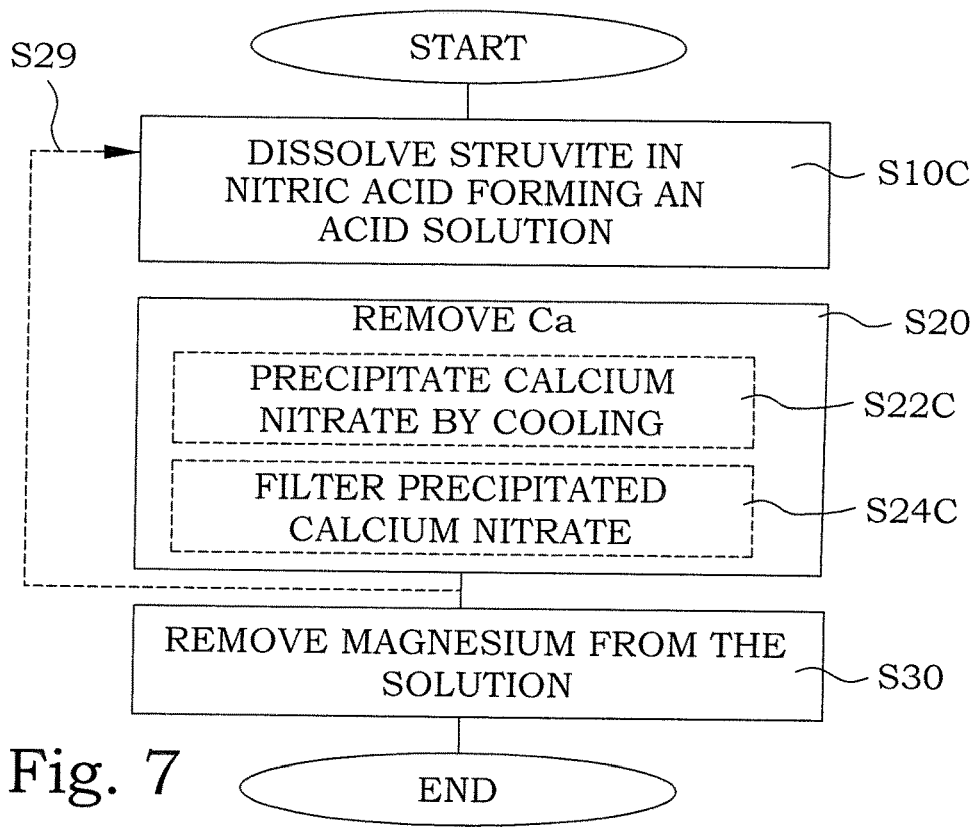

Alternatively, in embodiments where the mineral acid comprises nitric acid, also other possibilities to remove Ca exist. FIG. 7 illustrates such an embodiment. In step S10C, struvite is dissolved in nitric acid. A nitric acid solution comprising Ca ions has a relatively high solubility for calcium nitrate at or above room temperature. However, by cooling the acid solution, the solubility rapidly decreases and will eventually result in precipitation of calcium nitrate, which easily can be filtered away. Therefore, in step S22C, the acid solution is cooled, causing precipitation of calcium nitrate. In step S24C, the calcium nitrate is filtered away.

In other words, in an embodiment where the mineral acid is nitric acid the step of precipitating calcium compounds comprises cooling S22C of the solution after the step of dissolving S10 a feed material, thereby causing precipitation of calcium nitrate.

The use of nitric acid for dissolving struvite leads also in general to that the solution, after the step S30 of removing magnesium, comprises ammonium nitrate.

The use of hydrochloric acid for dissolving struvite leads also in general to that the solution, after the step S30 of removing magnesium, comprises ammonium chloride.

The use of phosphoric acid for dissolving struvite leads also in general to that the solution, after the step S30 of removing magnesium, comprises ammonium phosphate.

Figure 8:
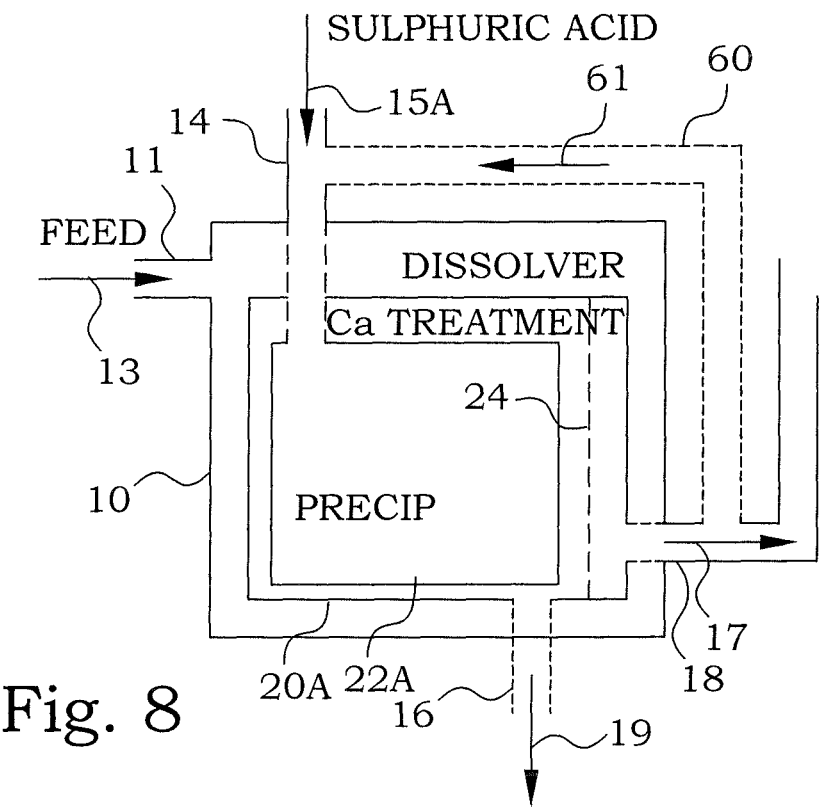
FIG. 8 illustrates a part of an embodiment of arrangement for struvite decomposition.

The use of different mineral acids does also have an impact on the detailed configuration of the arrangements. In FIG. 8, a part of an embodiment of arrangement where sulphuric acid is used for dissolving struvite is illustrated. The input 14 provides sulphuric acid 15A to the dissolver 10. However, at the same time, any Ca is precipitated as gypsum by the sulphate ions. In other words, the dissolving of the feed material 13 can be interpreted as taking place in the calcium-remover section 20A. The means for causing precipitation of calcium compounds 22A comprises in such a view the input 14 for the sulphuric acid 15A. The precipitated calcium compounds comprise gypsum.

Figure 9:
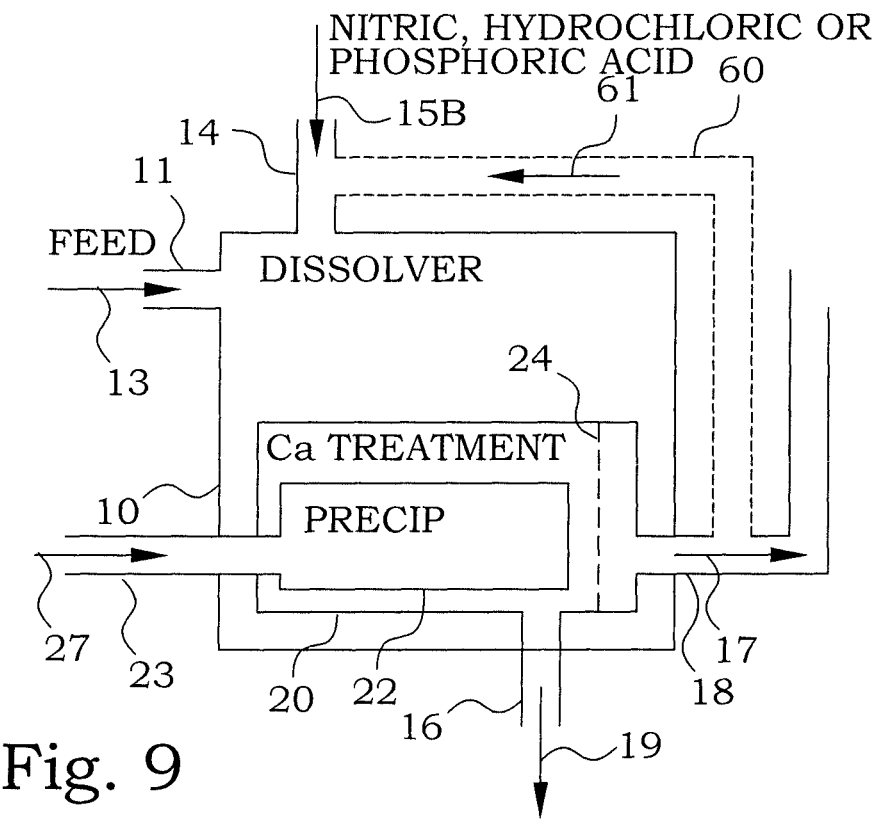
FIG. 9 illustrates a part of another embodiment of arrangement for struvite decomposition.

In FIG. 9, a part of another embodiment of arrangement for struvite decomposition is illustrated. Here, the mineral acid is at least one of hydrochloric acid, phosphoric acid and nitric acid. The input 14 provides hydrochloric acid, phosphoric acid or nitric acid 15B to the dissolver 10. In this embodiment, the means for causing precipitation of calcium compounds 22 comprises in input 23 for addition of sulphuric acid 27, thereby causing precipitation of any calcium compounds as gypsum.

Figure 10:
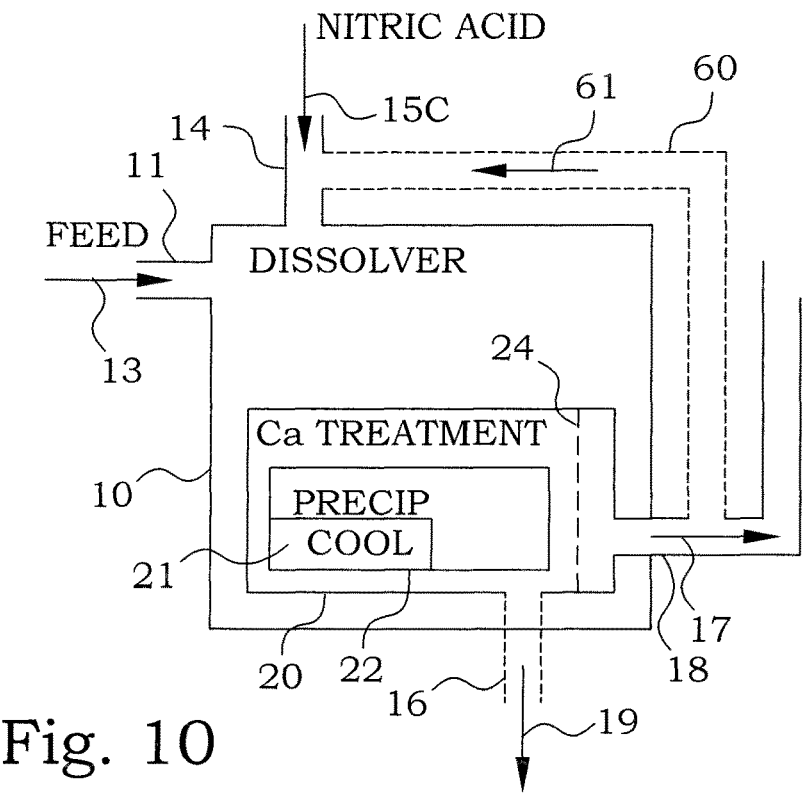
FIG. 10 illustrates a part of yet another embodiment of arrangement for struvite decomposition.

In FIG. 10, a part of yet another embodiment of arrangement for struvite decomposition is illustrated. Here, the mineral acid comprises nitric acid. The input 14 provides nitric acid 15C to the dissolver 10. The means for causing precipitation of calcium compounds 22 comprises a cooler equipment 21 arranged for cooling of the solution after the dissolving of the feed material 13, thereby causing precipitation of calcium nitrate.

The removal of the magnesium ions can be performed in different ways. If the magnesium ions are to be used in any particular way the form of the magnesium ion removal can be adapted to that indented final use of the ions. As hinted here above, magnesium ions together with phosphate ions are necessary to cause a struvite precipitation from waste material. If the available amount of phosphorous in the waste material is too low in comparison with e.g. the nitrogen content, it might be of interest to add both magnesium and phosphate ions in connection with the struvite precipitation. Magnesium ions separated from the dissolved struvite could then be re-used and the form in which the magnesium ions are removed may be adapted to be suitable for such recycling. In a preferred embodiment, the magnesium ions are removed by precipitation of substances comprising both magnesium and phosphate.

If the pH level of a solution with dissolved struvite is increased by adding ammonia, solid substances start to precipitate when the pH exceeds a level of about 4.5. Ammonia is a natural choice, since the ammonium ions already are present in the solution and no additional ions are therefore introduced.

According to literature (Abbona et al, 1982) for dilute dissolved struvite solutions with a concentration of up to 0.5 mol per litre, pH increase to over 4.5 should result in the precipitation of Newberyite. However, after extensive experimentation of the applicant with addition of ammonia to a dissolved struvite solution having a concentration of above 1 molar at pH levels of between 4.5 to 6, the analysis of the solid substances obtained shows that it comprises of struvite, i.e. the dissolving of the struvite is only being reversed.

The conclusions were that it was impossible to obtain precipitation of newberyite by addition of ammonia to a dissolved struvite with a concentration above 1 molar.

The supersaturation (β) of struvite (S) and newberyite (N) can be defined according to the following equations:

$$\beta_S = a(Mg^{2+})a(NH_3)a(HPO_4^{2-})/K_{SP}(S)$$

$$\beta_N = a(Mg^{2+})a(HPO_4^{2-})/K_{SP}(N)$$

where a(X) is the activity of X and $K_{SP}$ is the solubility product of the species in the reaction From the equations above it can be seen that a high concentration of ammonia favours the precipitation of struvite in contrast to newberyite.

The discouraging results obtained experimentally when increasing the pH with ammonia is most probably caused by the high activity of ammonium ions in the solution.

According to the literature, the supersaturation of newberyite can be increased by increasing the temperature of the solution. However, there is no information existing for the behaviour in a system in which ammonia is added to a dissolved struvite solution at high concentrations above 1 molar.

The present applicant has therefore tested experimentally the approach to add ammonia to a dissolved struvite solution, at a high concentration of above 1 molar accompanied by heating.

In one embodiment, the addition of ammonia is accompanied by heating the solution to a temperature above 50° C. This can be performed separately or at least partly simultaneously. It has been surprisingly found that heating the solution with a pH in the range of 4.5 to 6 caused by addition of ammonia causes precipitation of newberyite, leaving ammonia in the solution despite the high concentration. Preliminary tests indicate that any minor co-precipitation of struvite is reduced at even higher temperatures. At a temperature above 65° C., only small traces of struvite could be found and above a temperature of 80° C. all precipitated substances were essentially free from struvite, within the detection limit of the analysis used.

In an experiment with a struvite solution that was heated to 80° C., ammonia was used for increasing the pH to about 5. The resulting precipitated substances had a P (POL)/Mg atomic ratio of about 0.96, while the N (NH$_4$)/Mg ratio was below 0.01.

A small disadvantage of this approach is the need for heating. However, as will be discussed further below, there are embodiments in which the post-treatment of the ammonium salt solution can be combined with this step in order to reduce the total need of energy. Other alternatives are also described further below.

Figure 11:
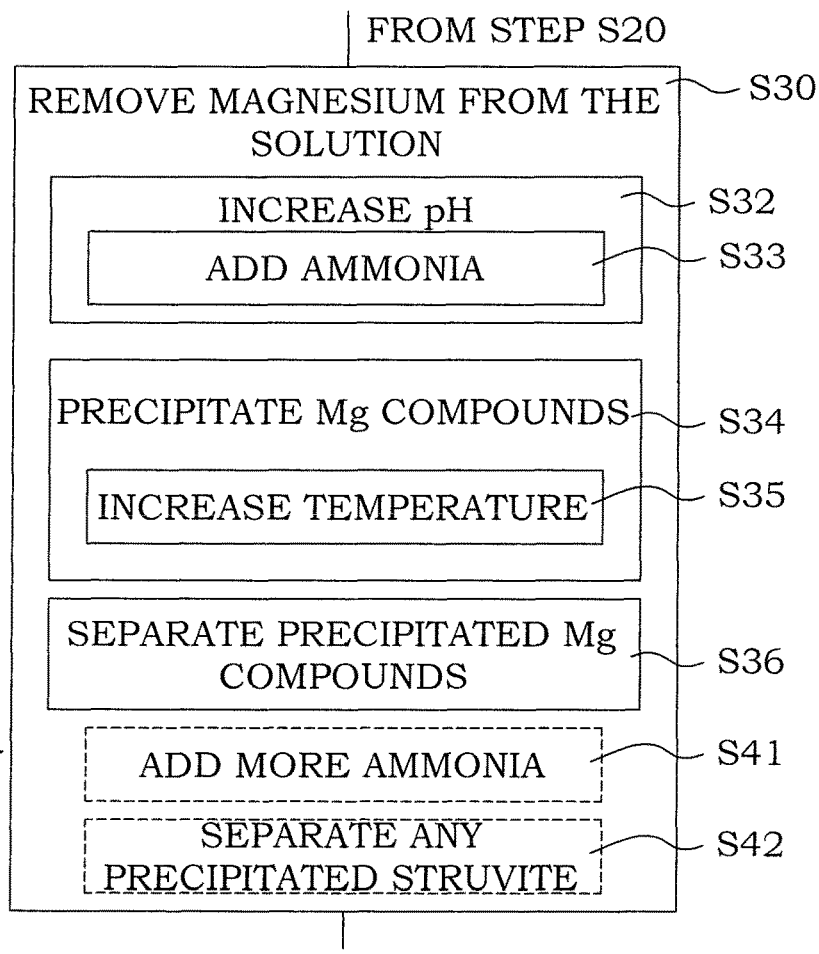
FIG. 11 illustrates a flow diagram of part steps of an embodiment of a step of removing magnesium from a solution.

FIG. 11 illustrates a flow diagram of part steps of an embodiment of step S30 of removing magnesium from the solution. The step S32 of increasing the pH is here performed by the step S33, in which ammonia is added. The step S34 of precipitating Mg compounds is here performed by increasing the temperature of the solution to above 50° C., preferably above 65° C., and most preferably above 80° C. The steps S32 and S34 are illustrated as being performed separately from each other. However, the steps S32-S35 can also be at least partly performed overlapping.

The tendency to co-precipitate struvite together with newberyite increases as the pH of the solution increase. However, according to the experiments a complete removal of magnesium from the solution could be obtained at pH of 6. Therefore, according the present invention, it can be preferable to perform the precipitation of magnesium in two steps. In the first step ammonia is added to a pH above 4.5 but below 6 while heating the solution to precipitate newberyite. In a second step, the remaining magnesium in the solution is precipitated in form of struvite by increasing the pH to 6, Precipitated struvite is recycled to the dissolution reactor.

In one embodiment, according to these ideas, two additional steps are provided. In step S41, performed after the separation of the precipitated magnesium compounds in step S36, additional ammonia is added to further increase the pH and causing precipitation of any remaining magnesium as struvite. In step S42, any precipitated struvite is separated and preferably re-entered into a subsequent struvite decomposition method as a part of the start material.

Figure 12:
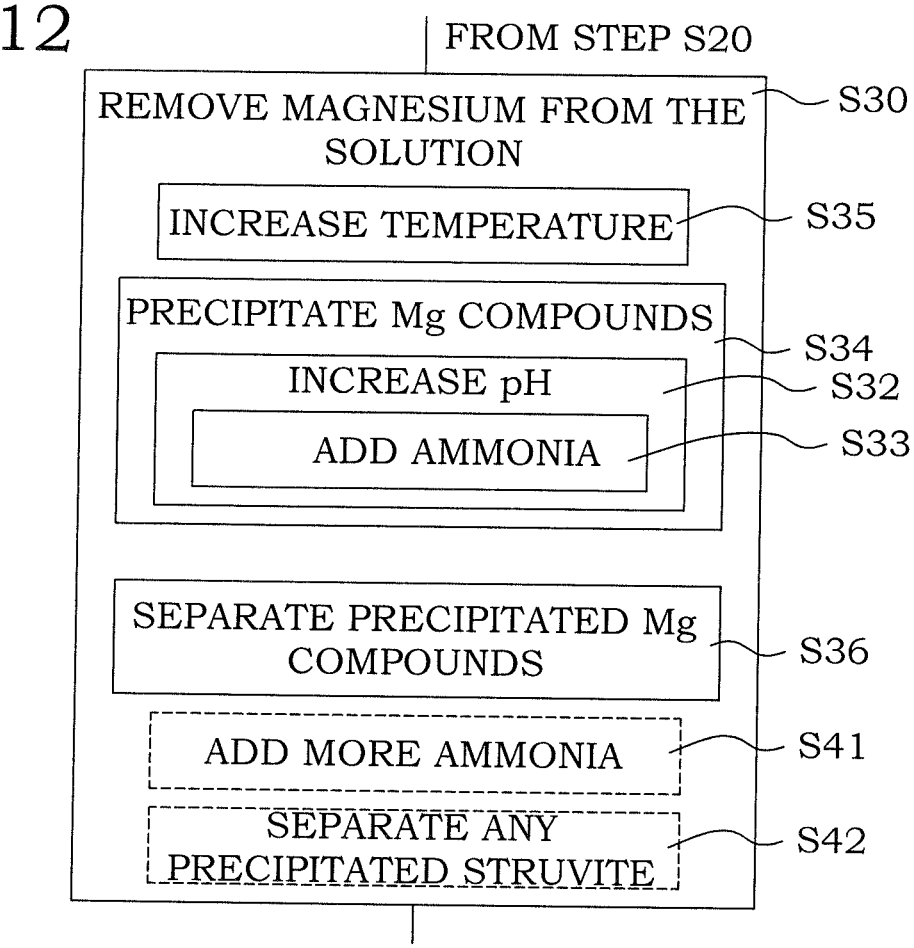
FIG. 12 illustrates a flow diagram of part steps of another embodiment of a step of removing magnesium from a solution.

In a particular embodiment, illustrated in FIG. 12, step S33 may even be performed after step S35. Step S33 then becomes a part step of step S32, which in turn is a part step of step S34. In this case, the risk of first forming struvite, which later has to undergo a presumably time-consuming re-crystallization as newberyite, is reduced.

Figure 13:
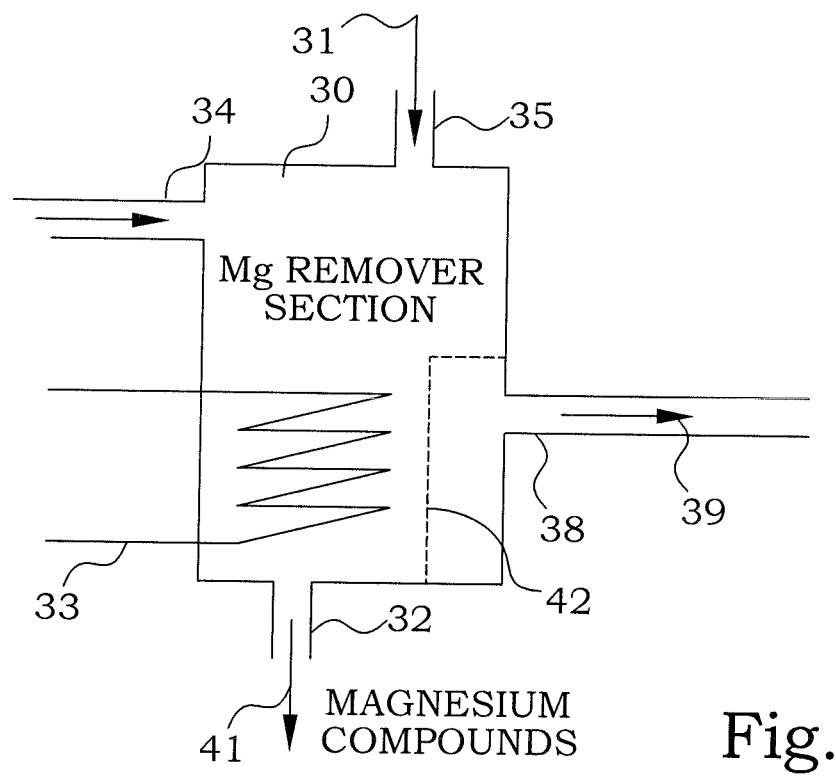
FIG. 13 illustrates schematically an embodiment of a magnesium remover section.

FIG. 13 illustrates an embodiment of a magnesium remover section 30. In this embodiment, magnesium-remover section 30 comprises an inlet 35 for ammonia 31 to be mixed with the solution to increase the pH thereof. The magnesium-remover section 30 further comprises a heating arrangement 33 for heating the mix of the solution and ammonia, thereby causing precipitation of magnesium compounds 41. The heating arrangement 33 is arranged for being capable to heat the mix of the solution and ammonia to a temperature above 50° C., preferably above 65° C., and most preferably above 80° C. A filter 42 is used to separate the precipitated magnesium compounds 41 from the remaining solution. Further preferred embodiments concerning the heating arrangement 33 will be discussed further below.

In cases where the two-step separation approach discussed above is to be operated, the inlet 35 and filter 42 can be re-utilized for filtering the remaining struvite. Alternatively, separate means for performing these extra steps can be provided in an analogue manner.

The produced newberyite may, as discussed further above, be utilized e.g. for precipitating struvite from an initial liquid of waste material. For such application, as well as for other applications as well, the newberyite is preferably washed for removing impurities. It was, however, found that washing with e.g. de-ionized water could result in a re-formation of struvite. This is probably due to the increase in pH caused by the water and any remaining ammonium. In order to avoid such struvite formation, it is preferred to wash the precipitated newberyite with acidic wash water of pH<5. In such cases, no conversion into struvite was found.

It can, however, be noted, as was briefly discussed above, that if newberyite is used for precipitating struvite from e.g. an initial liquid of waste material, some struvite operating as seed crystals could even be of benefit.

In another embodiment, the steps of increasing S32 a pH and precipitating S34 magnesium compounds are performed at least partly as a single process. This single process is adding S32A a base other than ammonia to the solution after the step of filtering. In this way, no extra ammonium ions are added to the solution and at least a part of the magnesium and phosphorus content may be precipitated as e.g. newberyite. Even though this embodiment may be generally operable in principle, this embodiment has, however, in many applications, certain minor disadvantages. The added base may introduce additional types of ions into the solution. For instance, if sodium hydroxide is added, the sodium ions will remain in solution and will end up in the final product mixed with the ammonium salts. Also, the precipitated substances tend to comprise a mixture between newberyite and other compounds, e.g. struvite.

In an experiment with a struvite solution the pH was increased to about 5 using NaOH at room temperature and a high concentration of dissolved struvite of about 1 molar. The resulting precipitated substances had a P ($PO_4$)/Mg atomic ratio of about 0.86, while the N ($NH_4$)/Mg ratio was below 0.01.

An embodiment of this type therefore comprises the use of hydromagnesite as the base free from ammonia. This ensures that no additional types of ions are introduced into the system. Addition of hydromagnesite is believed to follow the reaction:

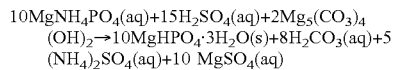
$10MgNH_4PO_4(aq)+15H_2SO_4(aq)+2Mg_5(CO_3)_4$
$(OH)_2 \rightarrow 10MgHPO_4 \cdot 3H_2O(s)+8H_2CO_3(aq)+5$
$(NH_4)_2SO_4(aq)+10\ MgSO_4(aq)$ In the second reaction above, gaseous carbon dioxide can also form which can leave the solution. Handling of such gaseous carbon dioxide will be described later in the text.

Since magnesium is added to the system, this means that the phosphorus is removed together with half of the magnesium with the newberyite. This thus also means that magnesium still will be present in the solution even after removal of the newberyite. This can be additionally treated in a subsequent step, where ammonia is used for further increase the pH. In the absence of phosphate ions, this results in precipitation of hydromagnesite again according to:

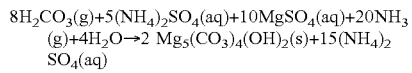
$8H_2CO_3(g)+5(NH_4)_2SO_4(aq)+10MgSO_4(aq)+20NH_3$
$(g)+4H_2O \rightarrow 2\ Mg_5(CO_3)_4(OH)_2(s)+15(NH_4)_2$
$SO_4(aq)$ The precipitated hydromagnesite can then be re-utilized in a next batch for the step of adding a base free from ammonia.

If carbon dioxide gas is allowed to leave the reactor, it can be scrubbed with the added ammonia, and the scrubber solution composted of ammonium carbonate is added parallel to addition of ammonia in order to form precipitated hydromagnesite.

Figure 14:
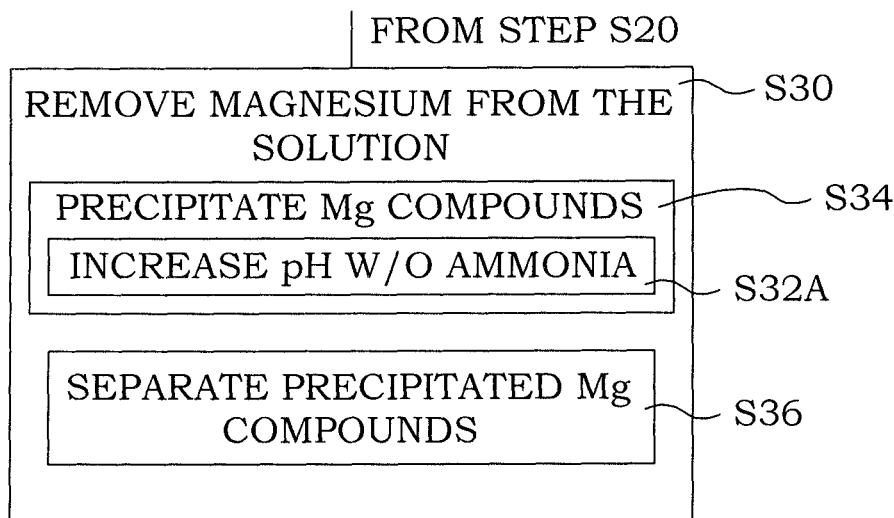
FIGS. 14-15 illustrate flow diagrams of part steps of yet other embodiments of a step of removing magnesium from a solution.

FIG. 14 illustrates a flow diagram of part steps of an embodiment of step S30 of removing magnesium from the solution. The step S34 of precipitating Mg compounds is here performed by the step S32A, in which pH is increased without use of ammonia. The precipitated Mg compounds are separated in step S36.

Figure 15:
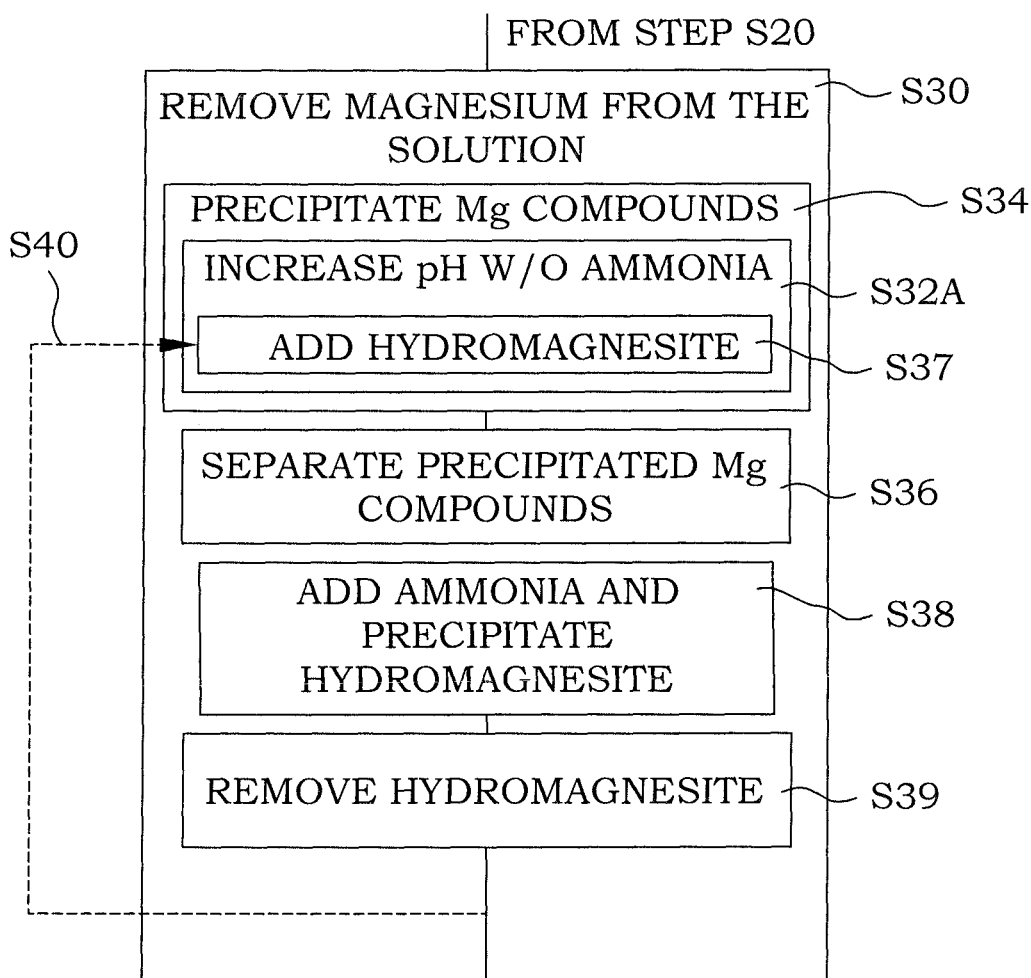

FIG. 15 illustrates a flow diagram of part steps of one preferred embodiment of step S30 of removing magnesium from the solution. The step S34 of precipitating Mg compounds is here performed by the step S32A, in which pH is increased without use of ammonia, which in turn is performed by adding hydromagnesite. This causes newberyite to precipitate, which is separated in step S36.

The remaining solution still contains magnesium and preferably, the step S30 also comprises step S38, in which ammonia is added, which results in that hydromagnesite once again precipitates. In step S39, the hydromagnesite is removed from the solution.

In an embodiment, the removed hydromagnesite is used in a subsequent step S37 for increasing a pH of a later solution, as indicated by the arrow S40. In other words, at least a part of the removed precipitated hydromagnesite is recirculated in S40 to be used in a subsequent step of adding a base free from ammonia, i.e. step S32A.

Figure 16:
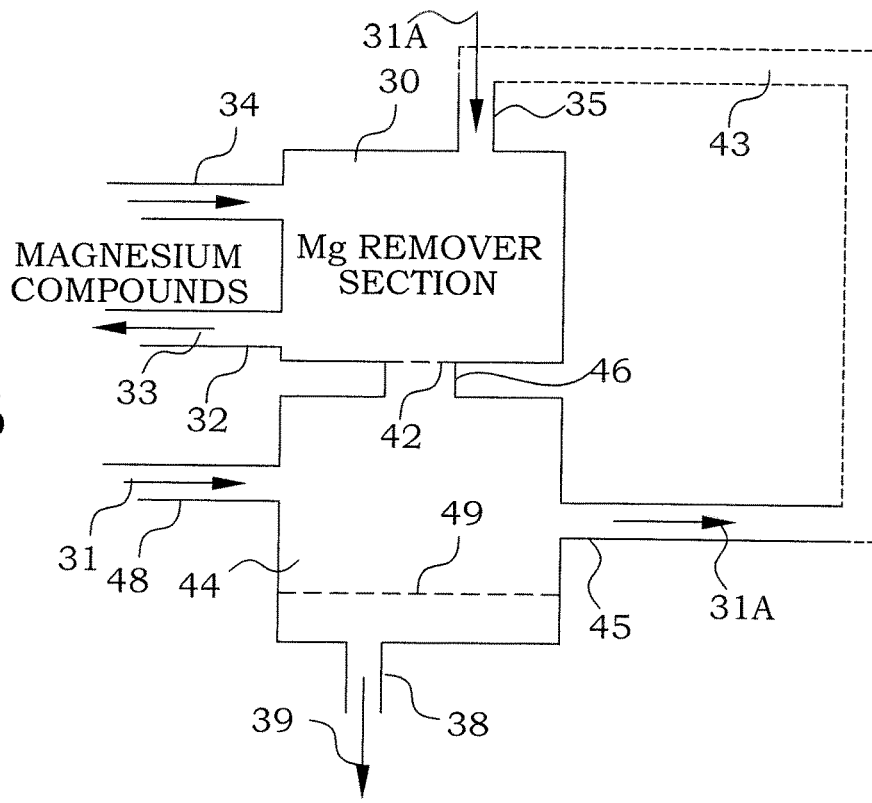
FIG. 16 illustrates schematically another embodiment of a magnesium remover section.

FIG. 16 illustrates a schematic drawing of an embodiment of a magnesium remover section 30. The magnesium-remover section 30 comprises an inlet 35 for a base free from ammonia to the solution. This addition of the base causes the precipitation of magnesium compounds. In a particular embodiment, the inlet 35 is provided for inlet of hydromagnesite 31A. The magnesium compounds 33 are precipitated and separated by means of the filter 42 and removed through the outlet 32.

In one embodiment, the magnesium-remover section 30 further comprises a mixing volume 44 having an inlet 46 for the solution after the separation of the precipitated magnesium compounds 32 and an inlet 48 for ammonia 31. The mixing of ammonia and the solution increases the pH further and causes thereby precipitation of hydromagnesite 31A. A hydromagnesite-removing arrangement 49, e.g. a filter, is provided for removing the precipitated hydromagnesite 31A from the solution.

In one embodiment, the magnesium removing section 30 further comprises a recirculating arrangement 43 arranged to recirculate at least a part of the removed precipitated hydromagnesite 31A from the hydromagnesite-removing arrangement 49 to the inlet 35 for a base free from ammonia to be used in a subsequent adding of a base free from ammonia.

Figure 17:
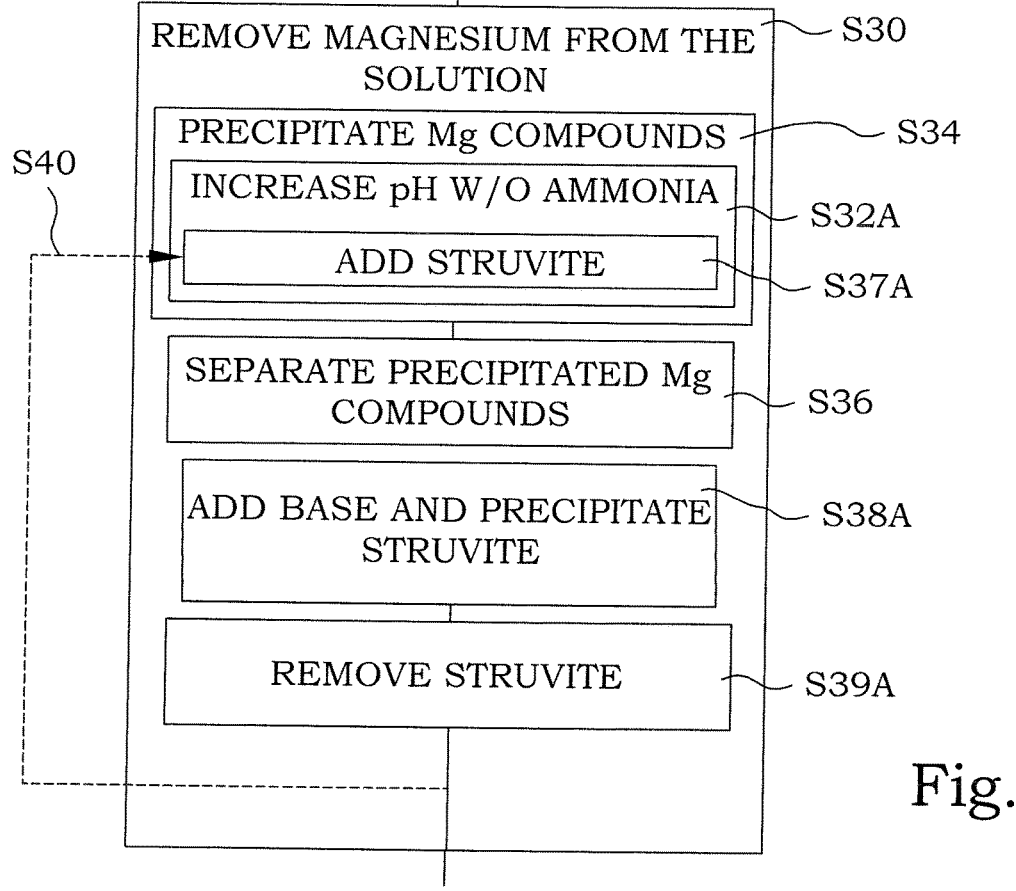
FIG. 17 illustrate a flow diagram of part steps of yet other embodiments of a step of removing magnesium from a solution.

In another embodiment, the removing of magnesium from the solution can be assisted by struvite addition. FIG. 17 illustrates a flow diagram of part steps of one preferred embodiment of step S30 of removing magnesium from the solution. The step S34 of precipitating Mg compounds is here performed by the step S32A, in which pH is increased without use of ammonia. In this embodiment, this pH increase is caused by adding struvite S37A, which is a base. This increase in pH causes newberyite to precipitate despite the fact that additional ammonium ions are added. The effect by the pH increase, favouring newberyite precipitation, is stronger that the effect of the increased ammonium concentration. The newberyite is separated in step S36.

The remaining solution still contains magnesium and preferably, the step S30 also comprises step S38A, in which additional base is added, e.g. ammonia, which results in that struvite once again precipitates, removing at least a part of the remaining phosphate and magnesium ions. In step S39A, the struvite is removed from the solution.

In an embodiment, the removed struvite is used in a subsequent step S37A for increasing a pH of a later solution, as indicated by the arrow S40. In other words, at least a part of the removed precipitated struvite is recirculated in S40 to be used in a subsequent step of adding a base free not being ammonia, i.e. step S32A.

In a test, three different struvite slurries were prepared; one with water, one with 0.35 M $(NH_4)_2SO_4$ solution and one with 2.75 M $(NH_4)_2SO_4$ solution. Sulphuric acid was added to decrease the pH within the range of 3-6. It could be noticed that the ammonium nitrogen concentration in the solution is high compared to the concentration of magnesium or phosphate ions at the higher pH range. When going to lower pH values, also the concentration of magnesium or phosphate ions increases. This is interpreted as that newberyite precipitates at higher pH but is dissolved at lower pH.

Starting from a value of pH 3, struvite was added to the three sample slurries. The concentration of ammonium nitrogen increased, which may be considered as obvious, since more ammonium is added. However, at the same time, the concentrations of both magnesium and phosphate ions were decreasing in the solution, despite the addition of these ions into the slurry. From a pH of about 4.5 to a pH of about 6, this effect increased. This is interpreted as if the added struvite dissolved and instead re-precipitated as newberyite. This effect was also shown to be present also at relatively high concentrations of sulphate ions.

Most of the magnesium and phosphate ions can thus be removed by such a procedure. However, the last few remains of magnesium and phosphate ions may be removed by a further increase of pH, at which precipitation of struvite becomes significant. In such a stage, even ammonia can be used for increasing the pH. The so produced struvite can then be reutilized as pH-increasing additions in a step earlier in the process.

The above experiments were performed with sulphate ions present in the solution, i.e. a situation similar to a dissolving using sulphuric acid. However, similar behaviours are also achieved by using other mineral acids, giving rise to relatively high concentrations of e.g. chlorine ions, nitrate ions or phosphate ions.

Figure 18:
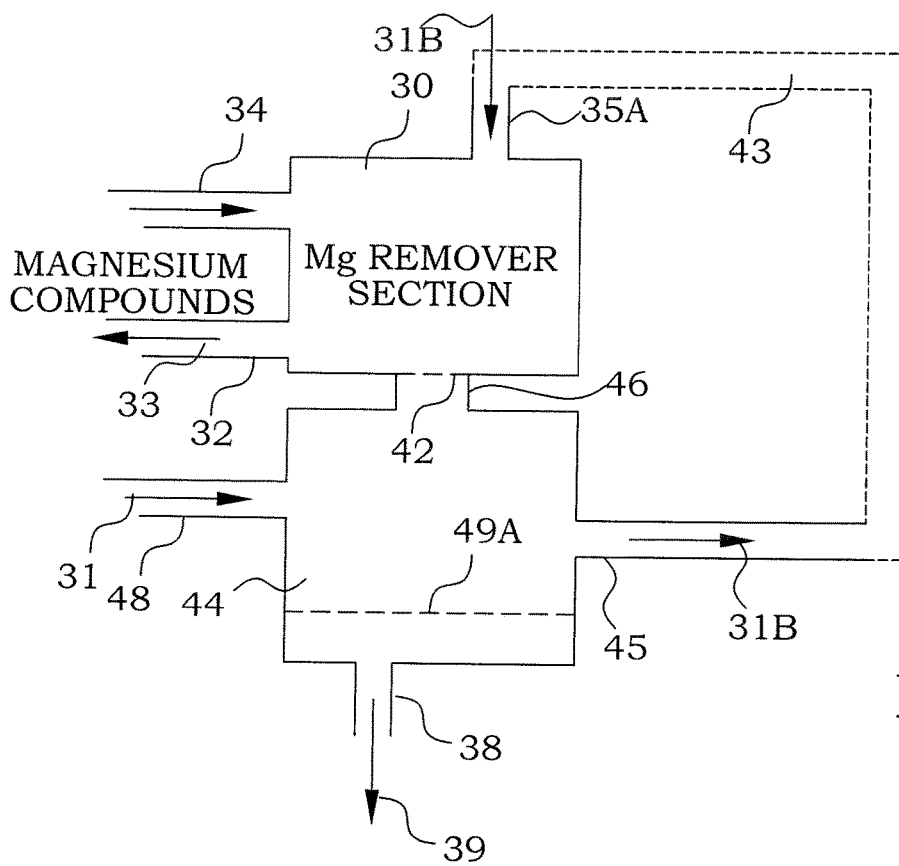
FIG. 18 illustrates schematically another embodiment of a magnesium remover section.

FIG. 18 illustrates a schematic drawing of an embodiment of a magnesium remover section 30. The magnesium-remover section 30 comprises an inlet 35A for struvite to the solution. This addition of the base causes the precipitation of magnesium compounds, typically newberyite. The magnesium compounds 33 are precipitated and separated by means of the filter 42 and removed through the outlet 32.

In one embodiment, the magnesium-remover section 30 further comprises a mixing volume 44 having an inlet 46 for the solution after the separation of the precipitated magnesium compounds 32 and an inlet 48 for a base, e.g. ammonia 31. The mixing of ammonia and the solution increases the pH further and causes thereby precipitation of struvite 31B. A struvite-removing arrangement 49A, e.g. a filter, is provided for removing the precipitated struvite 31B from the solution.

In one embodiment, the magnesium removing section 30 further comprises a recirculating arrangement 43 arranged to recirculate at least a part of the removed precipitated struvite 31B from the struvite-removing arrangement 49A to the inlet 35A for struvite to be used in a subsequent adding of a base.

The produced newberyite may, as discussed further above, in certain embodiments be washed according to the principles discussed further above.

Figure 19:
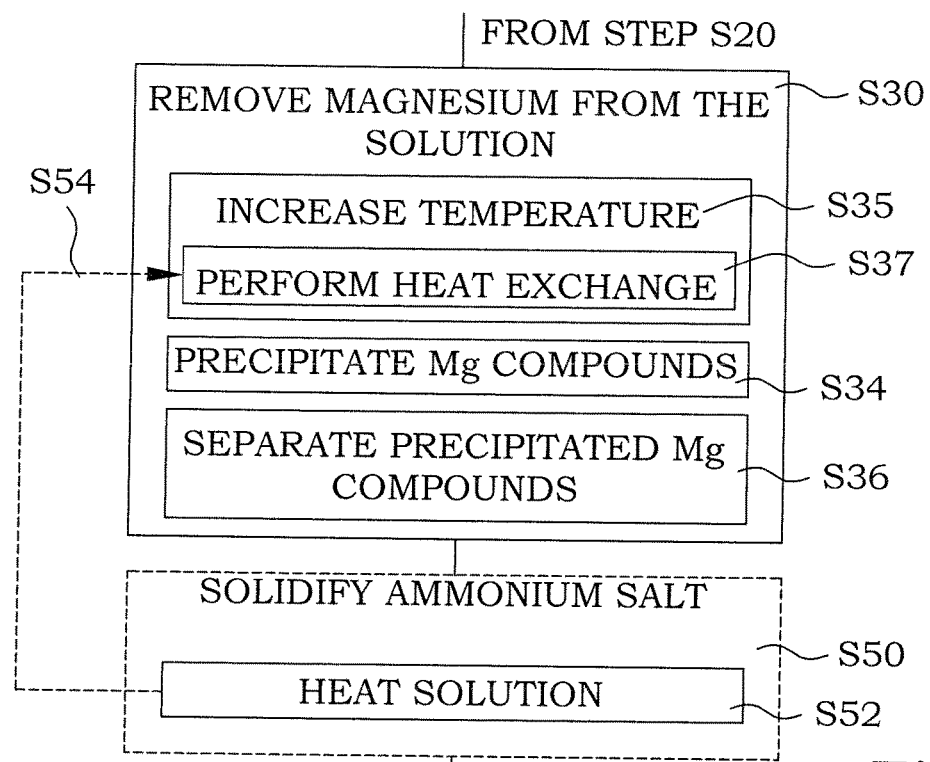
FIG. 19 illustrates a flow diagram of a part of another embodiment of a method for decomposing struvite.

As mention earlier, the solution of the ammonium salt of the mineral acid may be converted into a solid end product, as described in step S50. Such a crystallization can be performed in different ways, but the most straight-forward approach is to evaporate the solvent, i.e. water. In FIG. 19, steps of an embodiment of a part of a method for decomposing struvite are illustrated. Here, the step S50 of solidifying the ammonium salt of the mineral acid comprises step S52, in which the solution is heated after the step of removing magnesium S30. Thereby a solid product of the ammonium salt of the mineral acid is formed, together with a hot condensate.

In one of the embodiments described further above, a temperature of the solution is increased. Since the hot condensate produced in the heating step S52, this thermal energy can also be utilized for the earlier step. To this end, in a particular embodiment, as indicated by the arrow S54, the step of heating S35 the solution comprises the step S37 of performing a heat exchange between the hot condensate formed by a previous the step S52 of heating the solution after the step of removing magnesium S30, and the solution.

Figure 20:
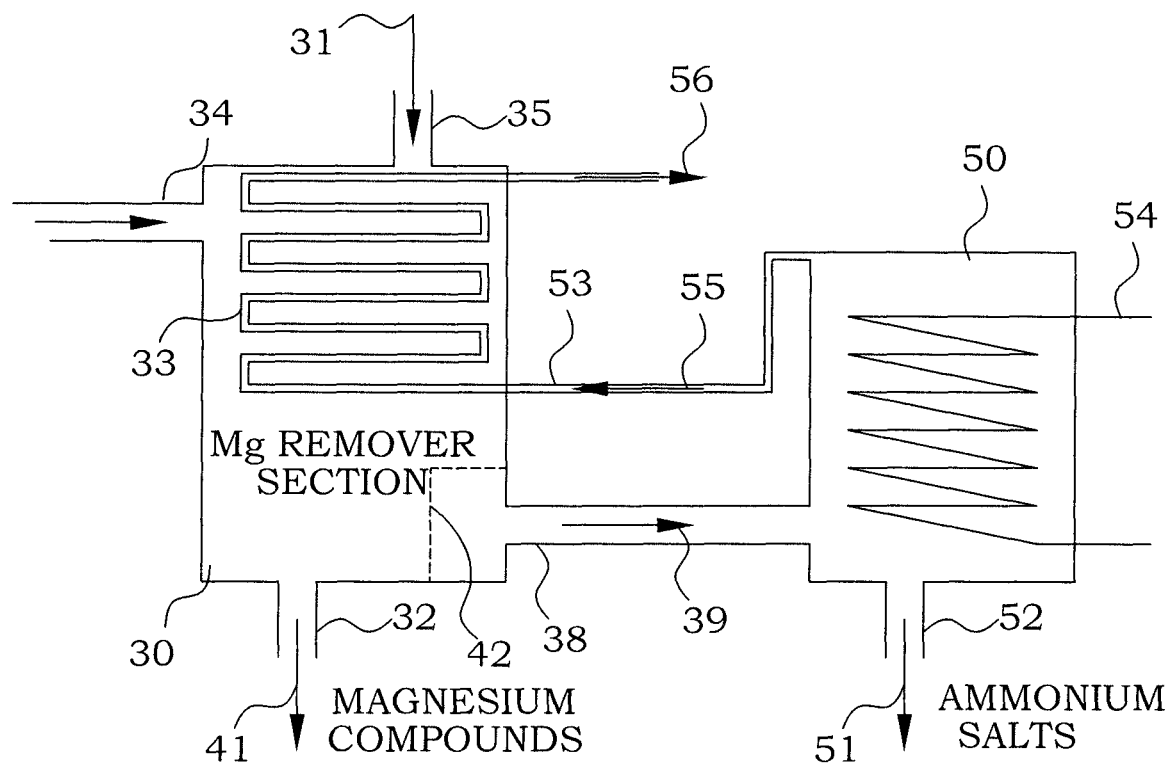
FIG. 20 illustrates schematically a part of another embodiment of an arrangement for decomposing struvite.

FIG. 20 illustrates parts of an embodiment of an arrangement for decomposing struvite; a magnesium remover section 30 and an end solidifying arrangement 50. The end solidifying arrangement 50 comprises a heating arrangement 54 arranged for heating the solution 39 comprising an ammonium salt of the mineral acid. Thereby, the solid product of the ammonium salt 51 of the mineral acid is formed, which is outputted through the outlet 52. As a result of this heating, also a hot condensate 55 is created, typically water vapour. The end solidifying arrangement 50 therefore also comprises an output 53 for the hot condensate 55. This embodiment is operable with all previously described alternatives of magnesium remover sections.

In a further embodiment, where the magnesium remover section 30 is arranged with a heating arrangement 33 for heating the mix of the solution and ammonia, additional advantages can be obtained. In such an embodiment, the output 53 for the hot condensate 55 of the end solidifying arrangement 50 is connected to the heating arrangement 33 for heating the mix of the solution and ammonia of the magnesium-remover section 30. The heating arrangement 33 for heating the mix of the solution and ammonia is then preferably arranged for performing a heat exchange between the hot condensate 55 formed by a previous heating of the solution in the end solidifying arrangement 50 and the mix of the solution and ammonia of the magnesium-remover section 30. In such a way, the heat energy required in the end solidifying arrangement 50 can, at least to a part, be re-used in the magnesium remover section 30, thereby improving the energy efficiency. Furthermore, since the solution in the magnesium remover section 30 is heated to a temperature of at least 50° C. and preferably at least 80° C., the solution 39 comprising an ammonium salt of the mineral acid is already hot and the required additional heating to accomplish the solidifying is much smaller than for operating on a cold solution.

A main advantage of the present invention is that it enables to handle all co-precipitated impurities following the ammonium struvite such as calcium phosphate, calcium carbonate, magnesium carbonate and potassium struvite as described before.

Large quantities of co-precipitated calcium phosphate can result in dissolved struvite solutions with a phosphorus to magnesium ratio higher than one. After removal of calcium and magnesium, excess phosphorus ends up in the fertilizer product in form of ammonium phosphate. Phosphorus is a desired element in fertilizers. If phosphorus is not desired in the end product it can be separated by known methods such as precipitation with lime, solvent extraction, etc.

Co-precipitated potassium struvite will result in potassium ions in the final fertilizer product. Potassium is a desired element in fertilizers.

In the description above external ammonia is used for precipitation of the magnesium compounds both directly and indirectly. However, according to the present ideas, the used ammonia can also be recycled from a part flow of the produced ammonium salt solution itself. In this embodiment, there is no need for addition of any external ammonia to the process.

In a first alternative, a part flow of the ammonium salt solution is treated by bipolar membrane electrodialysis to recover ammonia and acid which both are recycled within the process. In that way electricity is used instead of input chemicals.

Another alternative is to increase the pH of a part flow of the ammonium salt solution with a base and strip the ammonia in gaseous form for recycling within the process. Any type of base can be used for that purpose such as lime, potassium hydroxide, etc. The cation of the base can be incorporated in the fertilizer product or be removed from the ammonium salt solution by e.g. precipitation.

If lime is used as a base for ammonia stripping it can be removed from the ammonium salt solution by precipitation as calcium sulfate or calcium phosphate after adding suitable reactants such as sulfate or phosphate source. Addition of lime to an ammonium sulphate solution will result in the precipitation of calcium sulphate.

In case of using nitric acid for struvite dissolution, lime can be added to a part flow of the ammonium nitrate solution to increase the pH and enable ammonia stripping at high temperature. After ammonia stripping the solution will be composed of a mixture of ammonium nitrate and calcium nitrate which is a desired fertilizer. Calcium nitrate can also be precipitated from this solution by cooling in order to form a more defined ammonium nitrate fertilizer.

In the description above, the struvite has been described as being ammonium struvite. This is probably the most interesting aspect of the present technical findings. However, as pointed out in the background, also other substances in waste may be of interest.

Similar tests as was presented above have also been performed using potassium struvite. A slurry of struvite with a 0.33 M $K_2SO_4$ solution has been given a pH from 6 to 3 by addition of sulphuric acid. The concentration of potassium ions in solution is high already at a pH 6, while the concentrations of magnesium and phosphate ions increase only at low pH. This points to a precipitation of newberyite at the high pH end and a complete dissolving at lower pH values.

When adding potassium struvite to such a solution, the concentration of potassium ions increased while the concentrations of magnesium and phosphate ions decreased with increasing pH at least between pH 4.5 and pH 6. This point to that the same procedure as was described for ammonium struvite is feasible also for potassium struvite.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

Abbona F., Lundager Madsen H. E., Boistelle R., 1982. Crystallization of two magnesium phosphates, struvite and newberyite: Effect of pH and concentration. J. Crystal Growth 57, 6-14.

Haiming Huang, Lingyun Huang, Qingrui Zhang, Yang Jiang, Li Ding, 2015. Chlorination decomposition of struvite and recycling of its product for the removal of ammonium-nitrogen from landfill leachate. Chemosphere 136, 289-296.

Haiming Huang, Jiahui Liu, Jing Xiao, Peng Zhang, and Faming Gao, 2016. Highly Efficient Recovery of Ammonium Nitrogen from Coking Wastewater by Coupling Struvite Precipitation and Microwave Radiation Technology ACS Sustainable Chem. Eng., 4 (7), pp 3688-3696.

Li X. Z., Zhao Q. L., Hao X. D., Ammonium removal from landfill leachate by chemical precipitation, Waste Management, Volume 19, Issue 6, 1999, Pages 409-415.

Moerman W., Carballa M., Vandekerckhove A., Derycke D., Verstraete W. 2009. Phosphate removal in agro-industry: Pilot- and full-scale operational considerations of struvite crystallization. Water Research, Vol 43, 7, 1887-1892.

Siles J. A., Brekelmans J., Martin M. A., Chica A. F., Martin A., 2010. Impact of ammonia and sulphate concentration on thermophilic anaerobic digestion. Bioresource Technology, Vol 101, 23, 9040-9048.

Stefanowicz, T., Napieralska-Zagozda, S., Osińska, M., Samsonowska, K., 1992. Ammonium removal from waste solutions by precipitation of $MgNH_4PO_4$ II. Ammonium removal and recovery with recycling of regenerate. Resour. Conserv. Recycl. 6, 339-345.

Sugiyama, S., Yokoyama, M., Ishizuka, H., Sotowa, K. I., Tomida, T., Shigemoto, N., 2005. Removal of aqueous ammonium with magnesium phosphates obtained from the ammonium-elimination of magnesium ammonium phosphate.

Wilson, C. W., 2013. Ammonia recovery from municipal wastewater through a struvite formation-thermal decomposition cycle. M. A. Sc. Thesis, Department of Civil Engineering, The University of British Columbia, Vancouver, BC.

Ying Hao, Sanjay Kumar, Jung Hoon Kwag, Jae Hwan Kim, Jeong Dae Kim, and Chang Six Ra, 2011. Recycle of electrolytically dissolved struvite as an alternative to enhance phosphate and nitrogen recovery from swine wastewater. Journal of Hazardous Materials 195, 175-181

Zhang, S., Yao, C., Feng, X., Yang, M., 2004. Repeated use of $MgNH_4PO_4 \cdot 6H_2O$ residues for ammonium removal by acid dipping. Desalination 170, 27-32.

Zhang, T., Ding, L., Ren, H., Xiong, X., 2009. Ammonium nitrogen removal from coking wastewater by chemical precipitation recycle technology. Water Res. 43, 5209-5215.

The invention claimed is:

1. A method for decomposing struvite, comprising the steps of:
    dissolving a feed material comprising struvite in a mineral acid, thereby forming a solution comprising phosphate ions, magnesium ions and ammonium ions originating from dissolved struvite, wherein said solution includes said dissolved struvite and has an acid pH;
    first separating any insoluble components from said solution;
    removing magnesium from said solution after said first separating;
    said step of removing magnesium comprises the part steps of:
        increasing a pH of said solution to a pH in the range of 4.5 to 6;
        precipitating magnesium compounds that do not comprise ammonium; and
        second separating said precipitated magnesium compounds from said solution;
    whereby said solution after said step of removing magnesium comprises an ammonium salt of said mineral acid.

2. The method according to claim 1, wherein the feed material further comprises calcium compounds, whereby said dissolving of said feed material further comprises dissolving said calcium compounds into said solution; and by the further step of:
    removing calcium from said acid solution before said step of removing magnesium;
    said step of removing calcium comprises the part steps of:
        precipitating calcium compounds from said solution; and
        filtering said precipitated calcium compounds from said solution.

3. The method according to claim 2, comprising the further step of:

feeding back a part of said solution after said step of removing calcium to be added in another said step of dissolving a feed material.

4. The method according to claim 3, wherein an amount of bleed back in said step of feeding back after said step of removing calcium is controlled to give a final phosphate ion concentration exceeding 1 molar.

5. The method according to claim 1, wherein said steps of dissolving a feed material and precipitating magnesium compounds that do not comprise ammonium occurs at least partly concurrently, whereby struvite in said feed material is recrystallized into newberyite.

6. The method according to claim 1, wherein
said step of increasing a pH comprises addition of ammonia to said solution; and
said step of precipitating magnesium compounds comprises heating said solution to a temperature above 50° C.

7. The method according to claim 6, wherein said precipitated magnesium compounds comprise newberyite.

8. The method according to claim 7, comprising the further step of washing said precipitated newberyite with acidic wash water of pH<5.

9. The method according to claim 6, wherein said step of removing magnesium comprises the further steps of:
adding more ammonia to said solution after said step of second separating said precipitated magnesium compounds, thereby causing precipitation of struvite; and
removing said precipitated struvite from said solution.

10. The method according to claim 1, wherein said steps of increasing a pH and precipitating magnesium compounds are performed at least partly as a single process, said single process being adding a base to said solution after a step of filtering.

11. The method according to claim 10, wherein said base is struvite, and said precipitated magnesium compounds comprise newberyite.

12. The method according to claim 11, comprising the further step of washing said precipitated newberyite with acidic wash water of pH<5.

13. The method according to claim 11, wherein said step of removing magnesium comprises the further steps of:
adding a further base to said solution after said step of second separating said precipitated magnesium compounds, thereby causing precipitation of at least a part of remaining magnesium and phosphorus as struvite; and
removing said precipitated struvite from said solution.

14. The method according to claim 13, comprising the further step of:
recirculating at least a part of said removed precipitated struvite to be used in another said step of adding a base.

15. The method according to claim 1, wherein said struvite is at least one of ammonium struvite and potassium struvite.

16. The method according to claim 6, wherein said step of precipitating magnesium compounds comprises heating said solution to a temperature above 65° C.

17. The method according to claim 16, wherein said step of precipitating magnesium compounds comprises heating said solution to a temperature above 80° C.

* * * * *